(12) United States Patent
Todoroki et al.

(10) Patent No.: US 7,054,734 B2
(45) Date of Patent: May 30, 2006

(54) COMBUSTION CONTROL SYSTEM OF INTERNAL COMBUSTION ENGINE

(75) Inventors: Hikari Todoroki, Kanagawa (JP); Manabu Miura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/902,162

(22) Filed: Jul. 30, 2004

(65) Prior Publication Data

US 2005/0027431 A1 Feb. 3, 2005

(30) Foreign Application Priority Data

Jul. 30, 2003 (JP) ............................. 2003-282360

(51) Int. Cl.
*F02N 9/00* (2006.01)
(52) U.S. Cl. ........................ 701/105; 60/274; 60/285
(58) Field of Classification Search .................. None
See application file for complete search history.

(56) References Cited

U.S. PATENT DOCUMENTS

| | | | |
|---|---|---|---|
| 5,473,887 A | | 12/1995 | Takeshima et al. |
| 5,996,338 A | * | 12/1999 | Hirota ........................ 60/285 |
| 6,907,862 B1 | * | 6/2005 | Kitahara .................... 123/299 |
| 2005/0016163 A1 | * | 1/2005 | Kitahara ....................... 60/285 |
| 2005/0022505 A1 | * | 2/2005 | Kitahara ....................... 60/274 |
| 2005/0022513 A1 | * | 2/2005 | Kitahara ....................... 60/285 |
| 2005/0039442 A1 | * | 2/2005 | Ishibashi et al. ............. 60/285 |

FOREIGN PATENT DOCUMENTS

| | | |
|---|---|---|
| EP | 1 035 315 A2 | 9/2000 |
| JP | 2600492 B2 | 1/1997 |
| JP | 2000-320386 A | 11/2000 |
| WO | WO 93/07363 A1 | 4/1993 |

OTHER PUBLICATIONS

U.S. Appl. No. 10/895,423, filed Jul. 21, 2004, Kitahara.
U.S. Appl. No. 10/895,424, filed Jul. 21, 2004, Nishizawa et al.
U.S. Appl. No. 10/902,422, filed Jul. 30, 2004, Nishizawa et al.
U.S. Appl. No. 10/895,286, filed Jul. 21, 2004, Kitahara.

(Continued)

*Primary Examiner*—Andrew M. Dolinar
(74) *Attorney, Agent, or Firm*—Foley & Lardner LLP

(57) ABSTRACT

In a combustion control system of an engine employing an exhaust purifying device, a control unit determines, based on an operating condition of the exhaust purifying device, whether a request for an exhaust temperature rise is present. The control unit executes, by way of fuel injection control in presence of the request of the exhaust temperature rise, a split retard combustion mode in which a main combustion needed to produce a main engine torque and at least one preliminary combustion occurring prior to the main combustion are both achieved, and the preliminary combustion occurs near top dead center on a compression stroke, and the main combustion initiates after completion of the preliminary combustion. The control unit executes a fail-safe process that an injection timing of main fuel injection is phase-advanced, when a predicted temperature value of the exhaust purifying device exceeds a predetermined threshold value.

20 Claims, 24 Drawing Sheets

OTHER PUBLICATIONS

U.S. Appl. No. 10/895,335, filed Jul. 21, 2004, Kitahara.
U.S. Appl. No. 10/902,163, filed Jul. 30, 2004, Kitahara.
U.S. Appl. No. 10/895,409, filed Jul. 21, 2004, Kitahara.
U.S. Appl. No. 10/895,408, filed Jul. 21, 2004, Kitahara.
U.S. Appl. No. 10/895,407, filed Jul. 21, 2004, Ishibashi et al.

* cited by examiner

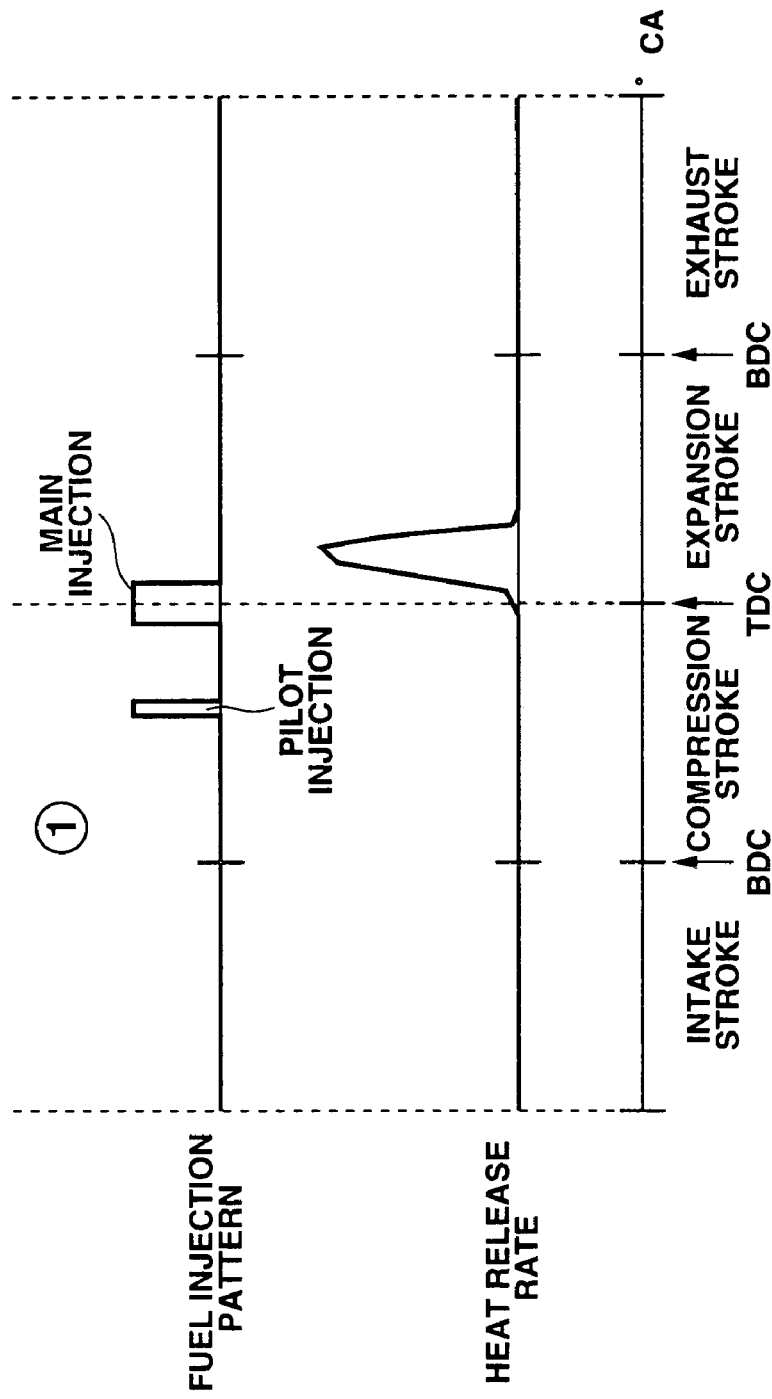

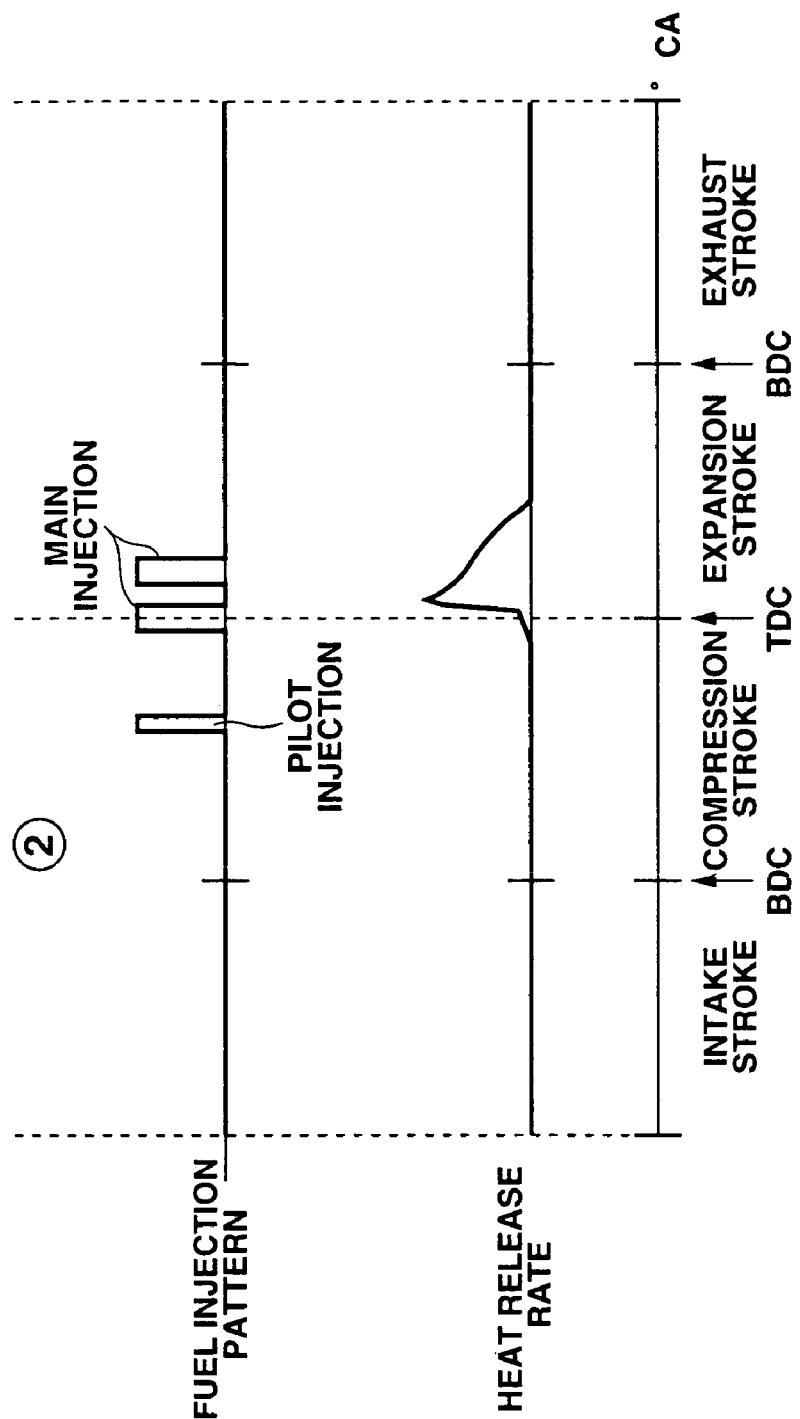

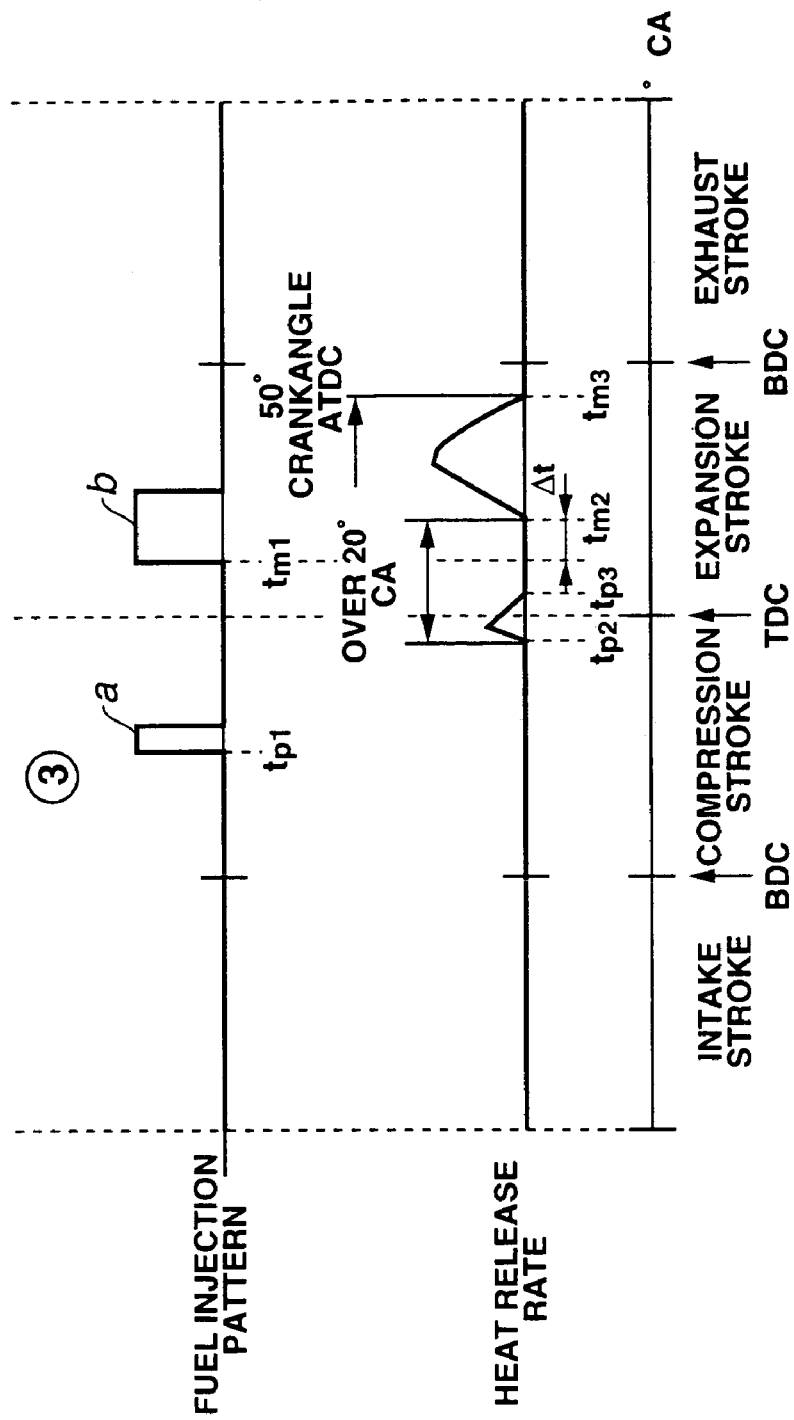

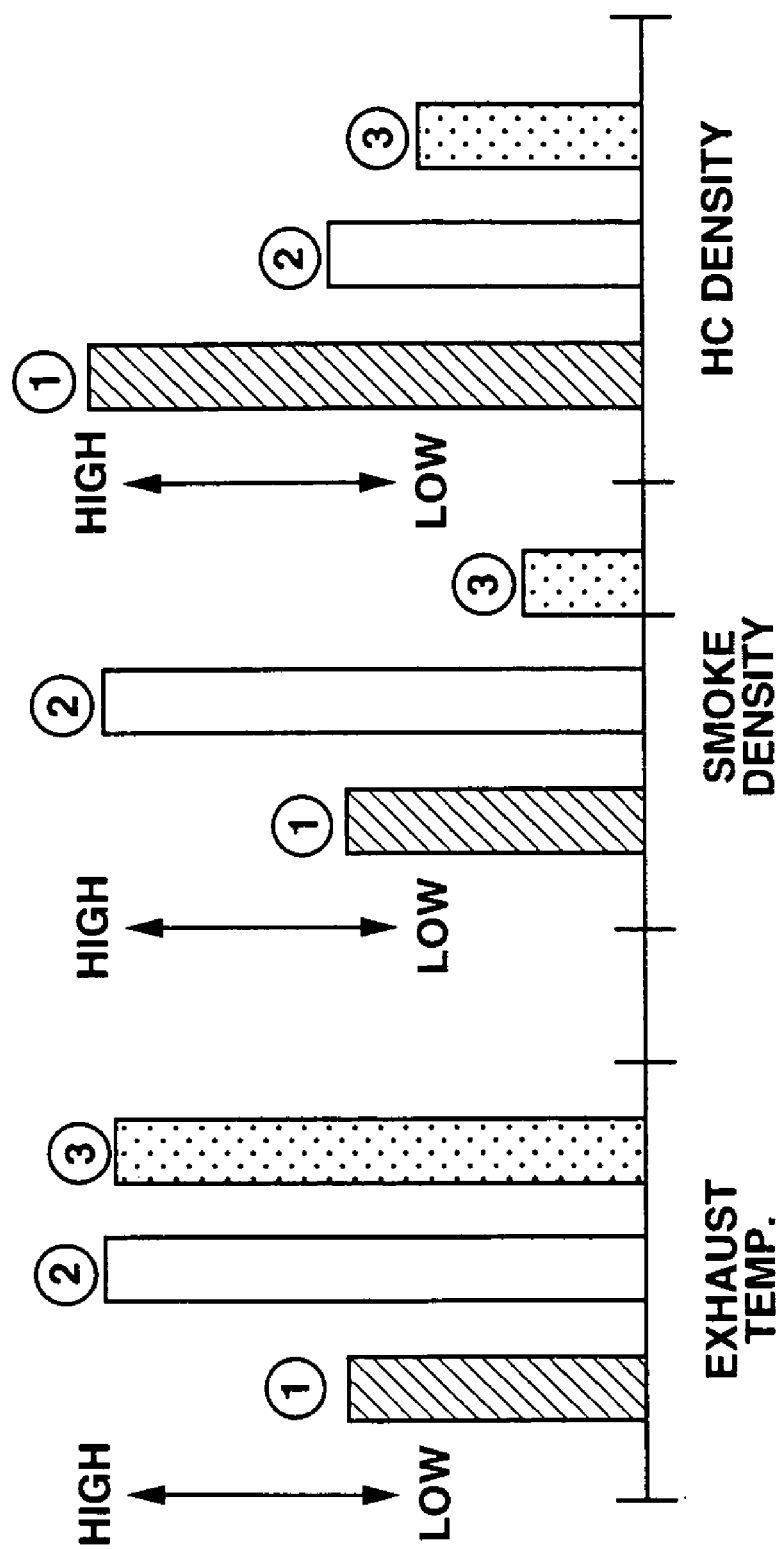

MAIN INJECTION TIMING

DESIRED FUEL INJECTION TIMING
FOR PRELIMINARY COMBUSTION

DESIRED FUEL INJECTION QUANTITY
FOR PRELIMINARY COMBUSTION

DESIRED FUEL INJECTION TIMING
FOR MAIN COMBUSTION

COMBUSTION CONTROL SYSTEM OF INTERNAL COMBUSTION ENGINE

TECHNICAL FIELD

The present invention relates to a combustion control system of an internal combustion engine, and specifically to the improvement of a combustion control technology for an internal combustion engine capable of executing a split fuel injection mode in presence of a request for an exhaust temperature rise such as a catalyst temperature rise needed during cold engine operation.

BACKGROUND ART

In recent years, there have been proposed and developed various combustion control technologies in fuel injection engine systems capable of executing a split fuel injection mode suitable for a rapid exhaust temperature rise, for example in presence of a request for rapid activation of catalyst. One such combustion control system with split fuel injection system interaction has been disclosed in Japanese Patent Provisional Publication No. 2000-320386 (hereinafter is referred to as "JP2000-320386"). In the Diesel-engine fuel injection control system disclosed in JP2000-320386, in presence of a request for a catalyst bed temperature rise, the fuel injection control system executes a split fuel injection mode in which a basic amount of fuel, determined based on a required engine torque, is sprayed or injected thrice separately by way of three-split fuel injection near top dead center (TDC) on the compression stroke. During the split fuel injection mode, if necessary, the fuel injection amount is increasingly compensated for.

SUMMARY OF THE INVENTION

However, during the split fuel injection mode executed by the fuel injection system disclosed in JP2000-320386, when taking into account the time interval (the fuel-injector pulse width or time duration) between the end of injection of the early injected fuel portion of the three-split fuel injection and the start of injection of the intermediately injected fuel portion, and the time interval between the end of injection of the intermediately injected fuel portion and the start of injection of the lastly injected fuel portion, these time intervals are set to be very short. Owing to the very short injection time intervals of split fuel injection, combustion of the early injected fuel portion, combustion of the intermediately injected fuel portion, and combustion of the lastly injected fuel portion tend to continuously occur. In more detail, the intermediate-injection fuel portion would be sprayed into the flame of the early-injection fuel portion, and then the last-injection fuel portion would be sprayed into the flame of the early-injection fuel portion and/or the flame of the intermediate-injection fuel portion. As a result of this, combustion of the intermediately and lastly injected fuel portions may be mainly composed of diffusion combustion rather than pre-mixed combustion. Assuming that an air/fuel mixture ratio (A/F ratio) is changed to rich (λ<1) under such a combustion condition (when a ratio of diffusion combustion to premixed combustion is great), there is an increased tendency for exhaust emissions of smoke and particulates to remarkably increase.

Accordingly, it is an object of the invention to provide a combustion control system of an internal combustion engine capable of realizing optimum combustion without increased exhaust emissions of smoke and particulates even when enriching an air/fuel mixture ratio (A/F ratio) in presence of a request for an exhaust temperature rise, and additionally to provide the combustion control system having a fail-safe function that prevents an exhaust purifying device (an exhaust purifying catalyst) from being damaged owing to an excessive exhaust temperature rise when intentionally rising the exhaust temperature.

In order to accomplish the aforementioned and other objects of the present invention, a combustion control system of an internal combustion engine employing an exhaust purifying device in an exhaust passage, comprises sensors that detect operating conditions of the engine, a control unit being configured to be electronically connected to the sensors, for combustion control and fail-safe purposes, the control unit comprising a processor programmed to perform the following, estimating an operating condition of the exhaust purifying device, determining, based on the operating condition of the exhaust purifying device, whether a request for a rise in an exhaust temperature is present, executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed, predicting a temperature of the exhaust purifying device to determine a predicted temperature value, and executing a fail-safe process according to which an injection timing of main fuel injection for the main combustion is compensated for in a timing-advance direction, when the predicted temperature value exceeds a predetermined temperature threshold value.

According to another aspect of the invention, a combustion control system of an internal combustion engine employing an exhaust purifying device in an exhaust passage, comprises sensor means for detecting operating conditions of the engine, a control unit being configured to be electronically connected to the sensor means, for combustion control and fail-safe purposes, the control unit comprising means for estimating an operating condition of the exhaust purifying device, means for determining, based on the operating condition of the exhaust purifying device, whether a request for a rise in an exhaust temperature is present, means for executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed, means for predicting a temperature of the exhaust purifying device to determine a predicted temperature value, and means for executing a fail-safe process according to which an injection timing of main fuel injection for the main combustion is compensated for in a timing-advance direction, when the predicted temperature value exceeds a predetermined temperature threshold value.

According to a further aspect of the invention, a method of executing a fail-safe function for an exhaust purifying device disposed in an exhaust passage of an internal combustion engine capable of recovering an operating condition of the exhaust purifying device, the method comprises estimating the operating condition of the exhaust purifying device, determining, based on the operating condition of the exhaust purifying device, whether a request for a rise in an exhaust temperature is present, executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed, predicting a temperature of the exhaust purifying device to determine a predicted temperature value, and executing a fail-safe process according to which an injection timing of main fuel injection for the main combustion is compensated for in a timing-advance direction, when the predicted temperature value exceeds a predetermined temperature threshold value.

According to a still further aspect of the invention, a method of executing a fail-safe function for an exhaust purifying device including a NOx trap catalyst that traps nitrogen oxides contained in exhaust gases when an exhaust air-fuel mixture ratio is lean, and a particulate filter that accumulates particulate matter contained in the exhaust gases and is disposed downstream of the NOx trap catalyst, both disposed in an exhaust passage of an internal combustion engine capable of recovering an operating condition of the exhaust purifying device, the method comprises disposing a first exhaust temperature sensor downstream of the NOx trap catalyst and upstream of the particulate filter, disposing a second exhaust temperature sensor downstream of the particulate filter, predicting a temperature of the NOx trap catalyst based on an exhaust temperature detected by the first exhaust temperature sensor, predicting a temperature of the particulate filter based on both of the exhaust temperature detected by the first exhaust temperature sensor and an exhaust temperature detected by the second exhaust temperature sensor, estimating the operating condition of the exhaust purifying device, determining, based on the operating condition of the exhaust purifying device, whether a request for a rise in an exhaust temperature is present, executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed, and executing a fail-safe process according to which an injection timing of main fuel injection for the main combustion is phase-advanced, when the at least one of the NOx-trap-catalyst temperature predicted and the particulate-filter temperature predicted exceeds a predetermined temperature threshold value.

The other objects and features of this invention will become understood from the following description with reference to the accompanying drawings.

BRIEF DESCRIPTION OF THE DRAWINGS

FIGS. 13A–13B are time charts showing a fuel injection pattern/combustion type in a first comparative example ①.

FIGS. 14A–14B are time charts showing a fuel injection pattern/combustion type in a second comparative example ②.

FIGS. 15A–15B are time charts showing a fuel injection pattern/combustion type in a split retard combustion mode ③ of the system of the embodiment.

FIG. 16 is an explanatory view showing comparison results concerning exhaust-emissions conditions, namely exhaust temperature, smoke concentration, hydrocarbons (HCs) concentration, respectively in case of the first comparative example ①, the second comparative example ②, and the split retard combustion mode ③ of the system of the embodiment.

DESCRIPTION OF THE PREFERRED EMBODIMENTS

Figure 1:
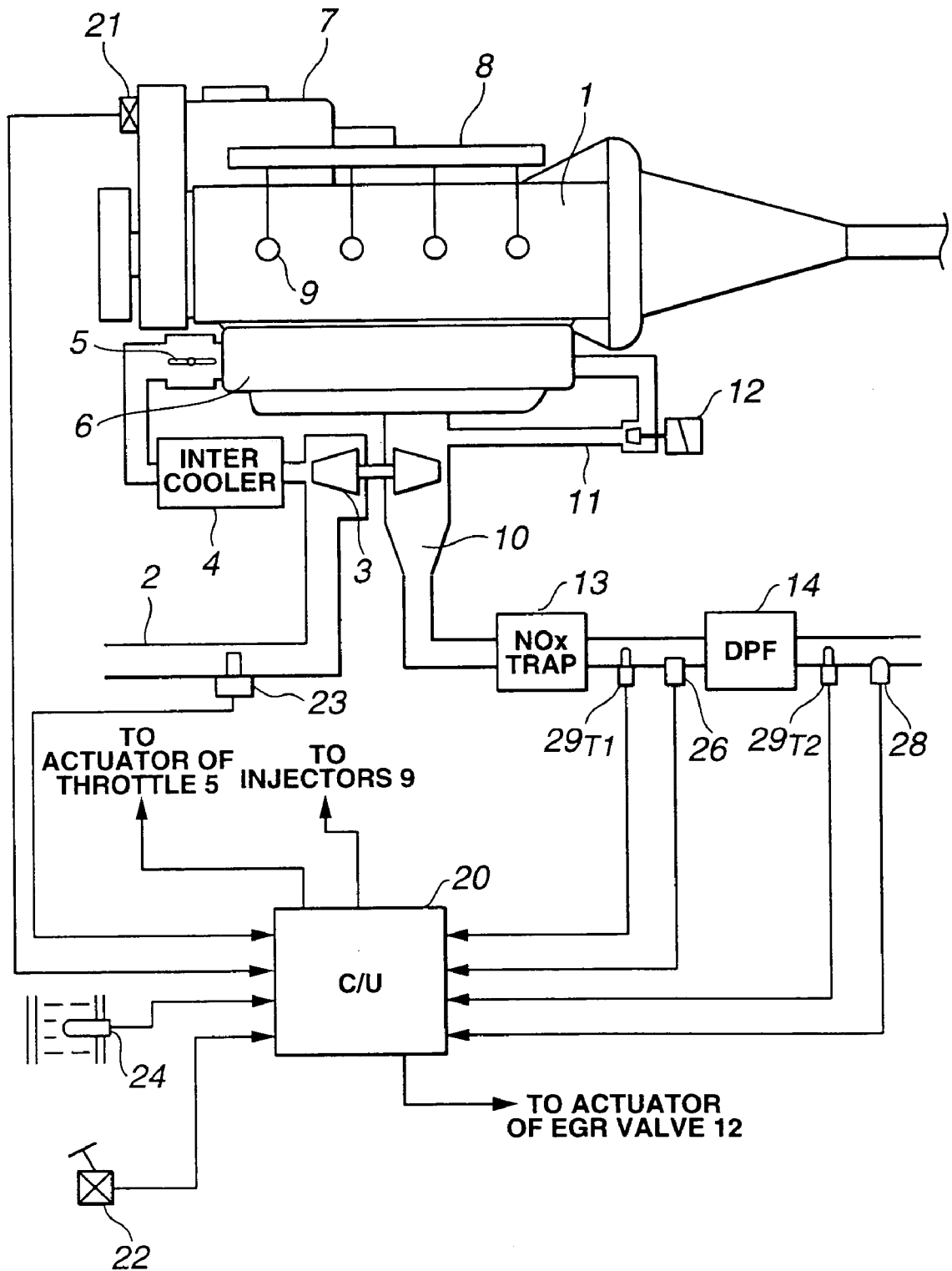
FIG. 1 is a system block diagram illustrating an embodiment of a combustion control system of an internal combustion engine.

Referring now to the drawings, particularly to FIG. 1, the combustion control system of the embodiment is exemplified in a turbocharged Diesel engine 1 equipped with an exhaust purifying device containing a NOx trap catalyst 13 and a diesel particulate filter (DPF) 14. As seen from the system block diagram of FIG. 1, an air compressor of a variable-nozzle turbocharger 3 is disposed in an intake-air passage 2 of Diesel engine 1 for introducing air for combustion through an inter-cooler 4 and an electronically-controlled throttle valve 5 via a collector 6 into each individual engine cylinder at a pressure in excess of that which can be obtained by natural aspiration. The throttle opening of throttle valve 5 is electronically controlled by means of a throttle actuator attached to throttle valve 5 and driven responsively to a control signal from an electronic engine control unit 20 (described later). Fuel is supplied by means of a common-rail type fuel injection system. High-pressure fuel, pressurized by a high-pressure fuel pump 7, is supplied to a common rail 8. High-pressure fuel is directly injected from a fuel injector valve (simply, a fuel injector) 9 of each engine cylinder into a combustion chamber. An air-fuel mixture of the air introduced into the combustion chamber and the fuel injected into the same combustion chamber is burned by way of compression ignition. On the exhaust stroke, exhaust gas flows into an exhaust passage 10. Part of the exhaust gas is sent back through engine 1 by way of an exhaust-gas-recirculation (EGR) system. As clearly shown in FIG. 1, the EGR system is comprised of an EGR passage 11 and an EGR control valve 12. For the purpose of EGR addition and the reduced amount of NOx, part of the exhaust gas is re-circulated into the intake manifold side of the induction system of engine 1 through EGR passage 11 and EGR control valve 12. In the same manner as throttle valve 5, the opening of EGR control valve 12 is electronically controlled by means of an EGR valve actuator attached to EGR control valve 12 and driven responsively to a control signal from control unit 20. An exhaust-gas turbine of variable-nozzle turbocharger 3 is disposed in exhaust passage 10. The remaining part of the exhaust gas is used to drive the exhaust-gas turbine of variable-nozzle turbocharger 3. As shown in FIG. 1, for the purpose of exhaust gas purification, NOx trap catalyst 13 is disposed in exhaust passage 10 and located downstream of the exhaust-gas turbine of turbocharger 3. When the exhaust A/F ratio is lean (λ>1), NOx trap catalyst 13 operates to capture or trap or adsorb nitrogen oxides (NOx). Conversely when the exhaust A/F ratio is rich (λ<1), NOx trap catalyst 13 operates to release NOx. NOx trap catalyst 13 is also equipped with an oxidation catalyst (precious metal) for oxidizing the incoming exhaust gas composition such as hydrocarbons (HCs) and carbon monoxide (CO).

Additionally, diesel particulate filter (DPF) 14 is disposed in exhaust passage 10 and located downstream of NOx trap catalyst 13, so as to accumulate particulate matter (PM) contained in the exhaust gases. DPF 14 is also equipped with an oxidation catalyst (precious metal) for oxidizing the incoming exhaust gas composition such as HCs and CO.

As shown in FIG. 1, control unit 20, which is incorporated in the system of the embodiment for combustion control of engine 1, generally comprises a microcomputer. Control unit 20 includes an input/output interface (I/O), memories (RAM, ROM), and a microprocessor or a central processing unit (CPU). The input/output interface (I/O) of control unit 20 receives input information from various engine/vehicle sensors, namely an engine speed sensor 21, an accelerator opening sensor (or an accelerator position sensor) 22, an airflow meter 23, and an engine temperature sensor (an engine coolant temperature sensor) 24. Engine speed sensor 21 detects the engine speed Ne, accelerator opening sensor 22 detects the accelerator opening APO, airflow meter 23 detects the actual intake-air quantity Qac of air drawn into the engine, and engine coolant temperature sensor 24 detects the engine coolant temperature Tw.

The input/output interface (I/O) of control unit 20 also receives input information from an upstream exhaust temperature sensor ($1^{st}$ exhaust temperature sensor) $29_{T1}$, an exhaust pressure sensor 26, a downstream exhaust temperature sensor ($2^{nd}$ exhaust temperature sensor) $29_{T2}$, and an A/F ratio sensor 28. Upstream exhaust temperature sensor $29_{T1}$ is screwed into exhaust passage 10 and located downstream of NOx trap catalyst 13 and upstream of DPF 14 for detecting the exhaust temperature just downstream of NOx trap catalyst 13. Exhaust pressure sensor 26 is screwed into exhaust passage 10 and located downstream of upstream exhaust temperature sensor $29_{T1}$ and upstream of DPF 14 for detecting the exhaust pressure. Downstream exhaust temperature sensor $29_{T2}$ is screwed into exhaust passage 10 and located downstream of DPF 14 for detecting the exhaust temperature just downstream of DPF 14. In the system of the shown embodiment, upstream exhaust temperature sensor $29_{T1}$ is provided to estimate a catalyst bed temperature (simply, a catalyst temperature, which will be described later by reference to the temperature estimation routine of FIG. 30), based on the exhaust temperature sensed just downstream of NOx trap catalyst 13, since it is difficult to directly detect the catalyst temperature of NOx trap catalyst 13. Upstream and downstream exhaust temperature sensors $29_{T1}$ and $29_{T2}$ are provided to estimate the DPF temperature (which will be described later by reference to the temperature estimation routine of FIG. 31), based on the exhaust temperatures sensed upstream and downstream of DPF 14, since it is difficult to directly detect the DPF temperature of DPF 14.

Within control unit 20, the central processing unit (CPU) allows the access by the I/O interface of input informational data signals from the previously-discussed engine/vehicle sensors 21–24, 26, 28, $29_{T1}$, and $29_{T2}$. The CPU of control unit 20 is responsible for carrying the engine control program stored in memories and is capable of performing necessary arithmetic and logic operations containing combustion control management processing, that is, electronic throttle control achieved through the throttle actuator of throttle valve 5, electronic fuel injection control (fuel injection timing control and fuel injection quantity control both achieved by the injectors of the electronic fuel injection system), EGR control achieved by the EGR valve actuator of EGR control valve 12, and exhaust emission control (described later). Computational results (arithmetic calculation results), that is, calculated output signals are relayed through the output interface circuitry of control unit 20 to output stages, namely the throttle actuator of throttle valve 5, the electromagnetic solenoids of injectors 9, and the EGR valve actuator of EGR control valve 12.

Hereunder described in detail is the emission control executed within control unit 20. Actually, the combustion control system of the embodiment achieves the exhaust emission control comprised of DPF regeneration, sulfur poisoning release, and NOx desorption-purification (or NOx trap catalyst regeneration, simply, NOx regeneration). During the DPF regeneration mode, the particulate matter (PM) accumulated in DPF 14 is burned and removed from DPF 14. During the NOx regeneration, NOx trapped is desorbed from NOx trap catalyst 13. During the sulfur poisoning release mode, sulfur oxides (SOx) trapped by NOx trap catalyst 13 is desorbed therefrom.

FIGS. 2 through 12 show the flow charts concerning the exhaust emission control executed within the processor of control unit 20 of the combustion control system of the embodiment.

Figure 2:
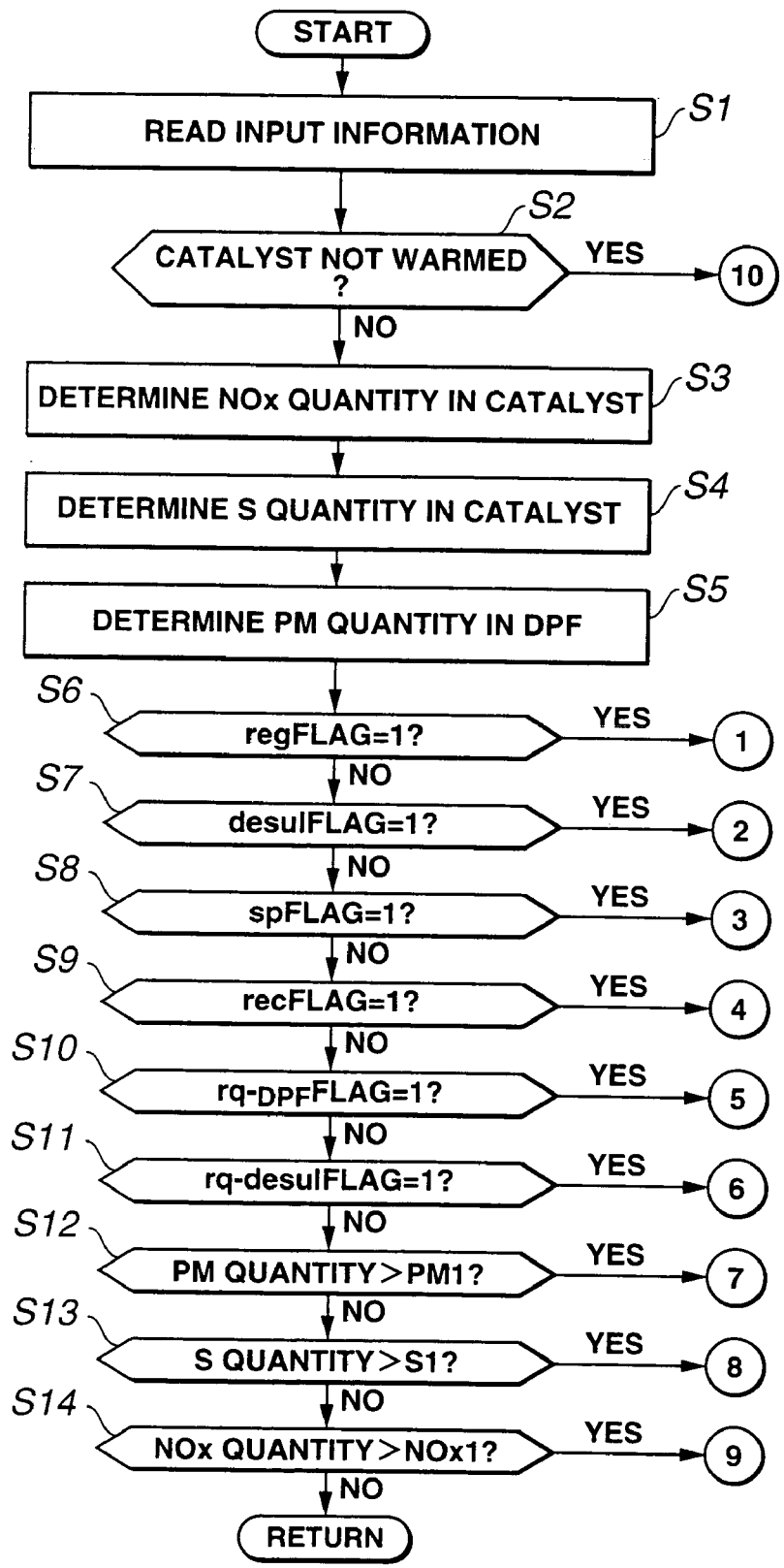
FIG. 2 is a flow chart showing an exhaust emission control routine executed by the combustion control system of the embodiment.

Referring now to FIG. 2, there is shown the exhaust emission control routine, which is executed as time-triggered interrupt routines to be triggered every predetermined time intervals.

At step S1, input information (Ne, APO, Qac, Tw, the catalyst temperature, exhaust pressure at the inlet of DPF 14, DPF temperature, and exhaust A/F ratio at the outlet of DPF 14) from the engine/vehicle sensors 21–24, 26, 28, 29$_{T1}$, and 29$_{T2}$ is read. As previously described, the catalyst temperature of NOx trap catalyst 13 is estimated based on the exhaust temperature detected by upstream exhaust temperature sensor 29$_{T1}$, whereas the DPF temperature is estimated based on the exhaust temperatures detected by upstream and downstream exhaust temperature sensors 29$_{T1}$ and 29$_{T2}$. One method to estimate the catalyst temperature of NOx trap catalyst 13 and the DPF temperature will be described later in reference to the flow charts shown in FIGS. 30 and 31.

At step S2, a check is made to determine whether NOx trap catalyst 13 is not yet warmed up (deactivated). When the catalyst temperature is less than or equal to a predetermined catalyst activation temperature T5, NOx trap catalyst 13 is not yet warmed up and thus the routine proceeds from step S2 of FIG. 2 to step S1001 of the warm-up promotion control routine shown in FIG. 12. Conversely when the catalyst temperature is greater than the predetermined catalyst activation temperature T5, NOx trap catalyst 13 has already been warmed up and activated and thus the routine proceeds from step S2 to step S3.

At step S3, a NOx accumulation quantity (simply, NOx quantity) of nitrogen oxides trapped and accumulated by NOx trap catalyst 13 is determined. For instance, the NOx quantity can be calculated or estimated based on an integrated value of engine speeds. The method to estimate the NOx quantity based on the integrated value of engine speeds is conventional and forms no part of the present invention, typical details of such accumulated NOx quantity estimation method being set forth, for example, in U.S. Pat. No. 5,473,887, corresponding to Japanese Patent No. 2600492, the teachings of which are hereby incorporated by reference.

Instead of using the integrated value of engine speeds, the traveling distance may be used for NOx quantity estimation. Assuming that the integrated value of engine speeds is used for NOx quantity estimation, the integrated value must be reset to "0" at the point of time when NOx desorption-purification has been completed during NOx regeneration or during SOx regeneration (sulfur poisoning release).

At step S4, a SOx accumulation quantity (simply, S quantity) of sulfur oxides accumulated into NOx trap catalyst 13 owing to sulfur poisoning is calculated. For instance, the SOx quantity can be calculated or estimated based on the integrated value of engine speeds, in the same manner as the NOx quantity estimation method as previously discussed. That is, SOx quantity can be calculated or estimated based on the integrated value of engine speeds or the traveling distance of the vehicle. Assuming that the integrated value of engine speeds is used for SOx quantity estimation, the integrated value must be reset to "0" at the point of time when sulfur poisoning release (SOx regeneration) has been completed.

At step S5, a PM accumulation quantity (simply, PM quantity) of particulate matter trapped and accumulated by DPF 14 is calculated. The exhaust pressure of the outlet of DPF 14 tends to rise, as the PM quantity increases. Thus, it is possible to estimate the PM quantity by comparing the exhaust pressure of the DPF inlet side, detected by exhaust pressure sensor 26, to a reference exhaust pressure, retrieved or determined based on the current engine operating conditions, such as the current engine speed and the current engine load. In lieu thereof, the PM quantity may be estimated based on the combined informational data of the exhaust pressure detected by exhaust pressure sensor 26 and the integrated value of engine speeds calculated from the time point of completion of the previous DPF regeneration or the combined informational data of the exhaust pressure detected by exhaust pressure sensor 26 and the traveling distance calculated from the time point of completion of the previous DPF regeneration.

At step S6, a check is made to determine whether a DPF regeneration period indicative flag $_{reg}$FLAG is set (=1). When the answer to step S6 is in the affirmative ($_{reg}$FLAG=1), the routine proceeds from step S6 of FIG. 2 to step S101 of the DPF regeneration control routine shown in FIG. 3. Conversely when the answer to step S6 is in the negative ($_{reg}$FLAG=0), the routine proceeds from step S6 to step S7.

At step S7, a check is made to determine whether a sulfur-poisoning release period indicative flag $_{desul}$FLAG is set (=1). The flag state of $_{desul}$FLAG=1 indicates that the system is executing the sulfur poisoning release mode for NOx trap catalyst 13. When the answer to step S7 is affirmative ($_{desul}$FLAG=1), the routine proceeds from step S7 to step S201 of the sulfur poisoning release control routine shown in FIG. 4. Conversely when the answer to S7 is negative ($_{desul}$FLAG=0), the routine proceeds from step S7 to step S8.

At step S8, a rich spike period indicative flag spFLAG is set (=1). The flag state of $_{sp}$FLAG=1 indicates that the system is executing the rich spike operating mode for NOx desorption-purification of NOx trap catalyst 13. When the answer to step S8 is affirmative ($_{sp}$FLAG=1), the routine proceeds from step S8 to step S301 of the rich spike control routine shown in FIG. 5. Conversely when the answer to S8 is negative ($_{sp}$FLAG=0), the routine proceeds from step S8 to step S9.

At step S9, a check is made to determine whether a melting loss prevention operating mode indicative flag $_{rec}$-

FLAG is set (=1). The flag state of $_{rec}$FLAG=1 indicates that the system is executing the melting loss prevention operating mode after the DPF regeneration and/or after the sulfur poisoning release, so as to prevent the DPF from being melt down or damaged owing to an excessive rise of the DPF temperature. When the answer to step S9 is affirmative ($_{rec}$FLAG=1), the routine proceeds from step S9 to step S401 of the melting loss prevention control routine shown in FIG. 6. Conversely when the answer to S9 is negative ($_{rec}$FLAG=0), the routine proceeds from step S9 to step S10.

At step S10, a check is made to determine whether a DPF-regeneration request indicative flag rq-DPFFLAG is set (=1). The flag state of $_{rq\text{-}DPF}$FLAG=1 indicates that there is a request for DPF regeneration. When the answer to step S10 is affirmative ($_{rq\text{-}DPF}$FLAG=1), the routine proceeds from step S10 to step S501 of the order-of-priority decision routine shown in FIG. 7 for determining whether priority should be given to which of (i) DPF regeneration, (ii) NOx regeneration (rich spike mode), and (iii) SOx regeneration (sulfur poisoning release mode), in presence of the request for DPF regeneration. Conversely when the answer to S10 is negative ($_{rq\text{-}DPF}$FLAG=0), the routine proceeds from step S10 to step S11.

At step S11, a check is made to determine whether a sulfur poisoning release request indicative flag $_{rq\text{-}desul}$FLAG is set (=1). The flag state of $_{rq\text{-}desul}$FLAG=1 indicates that there is a request for sulfur poisoning release. When the answer to step S11 is affirmative ($_{rq\text{-}desul}$FLAG=1), the routine proceeds from step S11 to step S601 of the order-of-priority decision routine shown in FIG. 8 for determining whether priority should be given to which of (i) SOx regeneration (sulfur poisoning release mode), (ii) NOx regeneration (rich spike mode), and (iii) DPF regeneration, in presence of the request for sulfur poisoning release. Conversely when the answer to S11 is negative ($_{rq\text{-}desul}$FLAG=0), the routine proceeds from step S11 to step S12.

At step S12, a check is made to determine whether the PM quantity, calculated through step S5, is greater than a predetermined PM quantity PM1. That is, the processor of control unit 20 determines, based on the comparison result of the current PM quantity and predetermined PM quantity PM1, whether now is the best time for DPF regeneration. When the answer to step S12 is affirmative (the current PM quantity>PM1), the routine flows from step S12 to step S701 of the DPF-regeneration request indicative flag $_{rq\text{-}DPF}$FLAG setting routine shown in FIG. 9, so as to set DPF-regeneration request indicative flag $_{rq\text{-}DPF}$FLAG to "1". Conversely when the answer to step S12 is negative (the current PM quantity≦PM1), the routine proceeds from step S12 to step S13.

At step S13, a check is made to determine whether the SOx quantity (S quantity), calculated through step S4, is greater than a predetermined SOx quantity Si. That is, the processor of control unit 20 determines, based on the comparison result of the current SOx quantity and predetermined SOx quantity S1, whether now is the best time for SOx regeneration (sulfur poisoning release). When the answer to step S13 is affirmative (the current SOx quantity>S1), the routine flows from step S13 to step S801 of the sulfur poisoning release request indicative flag $_{rq\text{-}desul}$FLAG setting routine shown in FIG. 10, so as to set sulfur poisoning release request indicative flag $_{rq\text{-}desul}$FLAG to "1". Conversely when the answer to step S13 is negative (the current SOx quantity≦S1), the routine proceeds from step S13 to step S14.

At step S14, a check is made to determine whether the NOx quantity, calculated through step S3, is greater than a predetermined NOx quantity NOx1. That is, the processor of control unit 20 determines, based on the comparison result of the current NOx quantity and predetermined NOx quantity NOx1, whether now is the best time for NOx regeneration (NOx desorption-purification). When the answer to step S14 is affirmative (the current NOx quantity>NOx1), the routine flows from step S14 to step S901 of the rich spike request indicative flag $_{rq\text{-}sp}$FLAG setting routine shown in FIG. 11, so as to set rich spike request indicative flag $_{rq\text{-}sp}$FLAG to "1". Conversely when the answer to step S14 is negative (the current NOx quantity≦NOx1), the routine of FIG. 2 returns to the main program.

Figure 3:
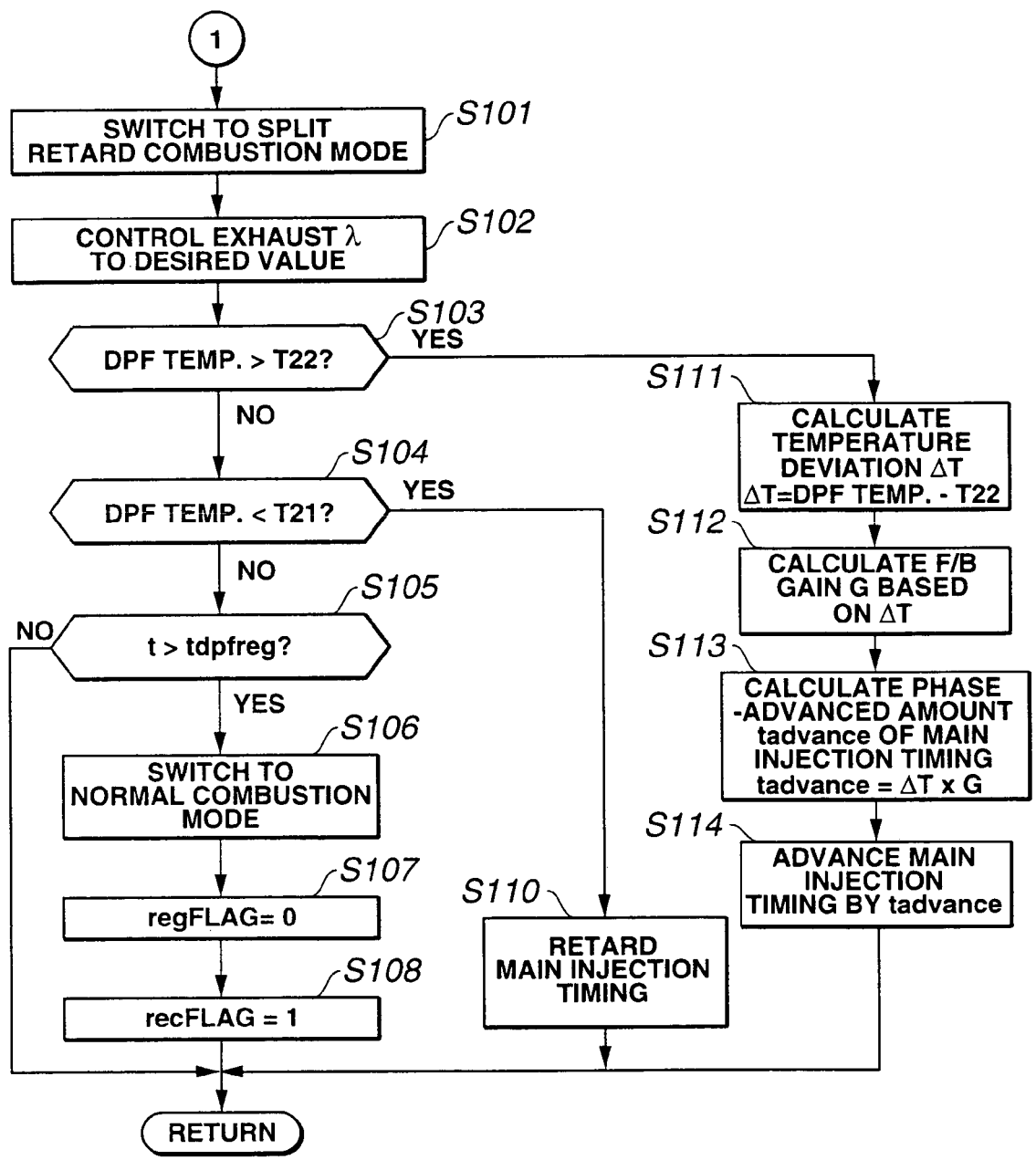
FIG. 3 is a flow chart showing a first subroutine (diesel particulate filter (DPF) regeneration mode) for exhaust emission control.

Referring now to FIG. 3, there is shown the DPF regeneration control routine. The DPF regeneration control routine of FIG. 3 is initiated under a condition that the PM quantity reaches predetermined PM quantity PM1, DPF-regeneration request indicative flag $_{rq\text{-}DPF}$FLAG is set (=1) through step S701 of FIG. 9, and thereafter DPF regeneration period indicative flag $_{reg}$FLAG is set (=1) as a result of execution of the order-of-priority decision routine (described later) of FIG. 7.

At step S101, for the purpose of DPF regeneration, the combustion mode of engine 1 is switched from a normal lean combustion mode to a split retard combustion mode (hereunder described in detail).

The split retard combustion mode executed by the system of the embodiment is advantageously effectively used for various exhaust emission control purposes, such as DPF regeneration, sulfur poisoning release, NOx desorption-purification (rich spike), and warm-up promotion (rapid catalyst activation).

During execution of the DPF regeneration mode, the exhaust λ (the Greek letter λ denotes an excess air factor) must be controlled within a specified range from 1 to 1.4, and additionally the DPF temperature must be kept above 600° C. On the other hand, during execution of the sulfur poisoning release mode (SOx regeneration mode), the exhaust λ must be controlled to be less than or equal to 1, and additionally the exhaust temperature must be kept to be greater than or equal to 600° C. When the engine is working in a normal operating range for lean combustion conditions, usually pilot injection is made. The pilot injection timing, exactly, the start of pilot injection (SOPI) is set to 40–10° of crank-angle (CA) before top dead center (BTDC) on the compression stroke. The pilot injection quantity is set within an injection-quantity range of 1 to 3 mm$^3$/st. The main injection timing, exactly, the start of main injection (SOMI) is set to be within an injection-timing range from 10° crankangle to −20° crankangle before TDC on the compression stroke. The time interval (the fuel-injector pulse width or time duration) between the end of pilot injection (EOPI) and the start of main injection (SOMI) is usually set to be within a crankangle range from 10° to 30°.

In the normal engine operating range, in other words, during the normal lean combustion operating mode, in order to achieve low-λ and high exhaust temperature conditions for the purpose of DPF regeneration and/or sulfur poisoning release, the quantity of intake air must be throttled properly. However, throttling the intake-air quantity may cause a drop in an in-cylinder compression end temperature, corresponding to an in-cylinder temperature near TDC (the end of the compression stroke), thus resulting in unstable combustion. Under such a condition, assuming that normal setting of pilot injection (that is, normal pilot injection timing and normal pilot injection quantity), suitable for the normal lean combustion operating mode, is used, it is necessary to advance an injection timing of main injection, occurring after the pilot injection (see the phase-advanced pulse indicating the main injection of FIG. 13A showing the first comparative example ①). For an exhaust temperature rise, it is desirable to retard the main injection timing. However, in case of the previously-noted fuel injection pattern as shown in FIG. 13A, exactly, the previously-noted setting of the pilot injection timing, pilot injection quantity (the pulse width of pilot injection), main injection timing, and main injection quantity (the pulse width of main injection), a phase-retarded amount of the main injection timing is considerably limited owing to the occurrence of unstable combustion. Thus, it is difficult to realize the low-λ and high exhaust temperature conditions for DPF regeneration and/or sulfur poisoning release, by way of the normal split fuel injection pattern shown in FIGS. 13A–13B. In addition to the above, in case of the normal split injection pattern of the first comparative example ①, as can be seen from the heat release rate shown in FIG. 13B, combustion of the early-injection fuel portion by pilot injection and combustion of the late-injection fuel portion by main injection tend to continuously occur. Thus, combustion of the late-injection fuel portion may be mainly composed of diffusion combustion rather than pre-mixed combustion.

In order to widen the phase-retardation limit of the main injection timing and to attain the low-λ and high exhaust temperature conditions for DPF regeneration and/or sulfur poisoning release, in the fuel injection control system as disclosed in JP2000-320386, main injection, occurring after pilot injection, is further split into two pulses, namely the first main injection and the second main injection occurring after the first main injection (see the two-split main injection of FIG. 14A showing the second comparative example ②). However, in case of the conventional three-split injection pattern of the second comparative example ②, as can be seen from the heat release rate shown in FIG. 14B, the next fuel injection is initiated during a time period when combustion of the earlier-injection fuel is lively developing. As a result, combustion of the early-injection fuel portion by pilot injection, combustion of the intermediate-injection fuel portion by the first main injection, and combustion of the late-injection fuel portion by the second main injection tend to continuously occur (see the sole ridged waveform of FIG. 14B indicating the heat release rate). That is, the intermediate-injection fuel portion by the first main injection is sprayed into the flame of the early-injection fuel portion by pilot injection, and then the late-injection fuel portion by the second main injection is sprayed into the flame of the early-injection fuel portion and/or the flame of the intermediate-injection fuel portion. Under these conditions, as soon as the first main injection initiates, the intermediate-injection fuel portion by the first main injection begins to burn at once. In a similar manner, as soon as the second main injection initiates, the late-injection fuel portion by the second main injection begins to burn at once. This causes an increased ratio of diffusion combustion to pre-mixed combustion, and therefore an equivalent ratio, defined by a ratio of a theoretical requirement to a quantity of air supplied, becomes rich partially in the combustion chamber. Such a rich equivalent ratio produces increased exhaust emissions of smoke and particulates.

Taking the results of analyses of the split fuel injection patterns shown in FIGS. 13A–13B and 14A–14B into consideration, as can be appreciated from the fuel injection pattern and heat release rate shown in FIGS. 15A–15B, the combustion control system of the embodiment achieves a so-called split retard combustion mode ③ by controlling fuel injection in a manner such that the system executes at least two split fuel injection operation (see the preliminary fuel injection denoted by "a" and the main fuel injection denoted by "b" in FIG. 15A), so that (i) a main combustion needed to produce a main engine torque and (ii) at least one preliminary combustion occurring prior to the main combustion are both achieved, and additionally the at least one preliminary combustion takes place near TDC on the compression stroke and additionally the main combustion initiates after the preliminary combustion has been completed. That is, as can be seen from the injection pattern of FIG. 15A, fuel is first sprayed or injected on the compression stroke of one complete operating cycle of the four-cycle engine 1 (see the preliminary injection "a" in FIG. 15A), for achieving the preliminary combustion, required for a rise in in-cylinder compression end temperature near TDC (near the end of the compression stroke). The fuel injection quantity of preliminary injection "a", needed to create the heat release (see the comparatively small ridged waveform of FIG. 15B indicating the preliminary-combustion heat release rate) at the preliminary combustion operation, is different depending on engine operating conditions. In the system of the embodiment, the preliminary injection quantity of preliminary injection "a" is set to a fuel injection quantity (see the characteristic map of FIG. 19) needed to ensure a heat release for preliminary combustion and additionally needed in order for an in-cylinder temperature obtained during the main fuel injection period for main combustion to exceed a self-ignitable temperature value. Also, it is possible to enhance the combustion stability of preliminary combustion by appropriately changing the preliminary injection quantity and the preliminary injection timing of preliminary injection "a" needed for preliminary combustion, depending on the compression end temperature, which is predicted based on each of engine operating conditions. Please note that main injection "b" needed for main combustion is initiated after TDC, so that the main combustion (see the comparatively large ridged waveform of FIG. 15B indicating the main-combustion heat release rate) initiates after the preliminary combustion, occurring near TDC on the compression stroke owing to preliminary injection "a", has been completed. According to the split retard combustion mode ③ of the system of the embodiment, it is possible to widen the retardation limit of the main combustion by appropriately rising the in-cylinder temperature by way of the preliminary combustion, and thus to enhance the controllability to the desired in-cylinder temperature (see the comparatively widened time interval $(t_{m1}-t_{p1})$ between the start tp1 of preliminary injection "a" and the start $t_{m1}$ of main injection "b" in FIG. 15A and see the comparatively widened time interval $(t_{m2}-t_{p2})$ between the start $t_{p2}$ of preliminary combustion and the start $t_{m2}$ of main combustion in FIG. 15B). Additionally, it is possible to ensure the ignition delay duration (see the time duration $\Delta t=(t_{m2}-t_{m1})$ between the start $t_{m1}$ of main injection "b" and the start $t_{m2}$ of main combustion (the start of heat release during the main combustion operation) by initiating main injection "b" after the preliminary combustion has been certainly completed (see the starting point $t_{m1}$ of main injection "b" occurring after the end $t_{p3}$ of preliminary combustion in FIGS. 15A–15B). The increased ignition time duration $\Delta t$ ensures an increased ratio of pre-mixed combustion to diffusion combustion during the main combustion period, thereby resulting in reduced smoke emissions or reduced unburned HC emissions. The time period $(t_{m2}-t_{p2})$ between the start $t_{p2}$ of preliminary combustion (the start of heat release during the preliminary combustion operation) and the start $t_{m2}$ of main combustion varies depending on engine speed Ne. It is desirable to retard the start $t_{m2}$ of main combustion from the start $t_{p2}$ of preliminary combustion by at least 20 degrees of crankangle (20° CA), for initiating main combustion after completion of preliminary combustion, in other words, after the heat release produced owing to preliminary combustion has completely terminated (see the heat-release termination point $t_{p3}$ of FIG. 15B). By virtue of setting of the time period $(t_{m2}-t_{p2})$ between the start $t_{p2}$ of preliminary combustion and the start $t_{m2}$ of main combustion at 20 degrees or more of crankangle, it is possible to effectively suppress or prevent the main combustion from being deteriorated, thus suppressing or preventing smoke emissions from increasing. In addition to the above, during the split retard combustion mode, the main combustion begins to develop on the expansion stroke, and thus the combustion velocity is very slow. As a result, the end $t_{m3}$ of main combustion becomes at least 50° CA or more after TDC on the compression stroke. In this manner, it is possible to realize the moderate main combustion operating mode by retarding the end $t_{m3}$ of main combustion as much as possible, thereby effectively reducing combustion noise.

FIG. 16 shows the comparison results of exhaust emission conditions, among the first comparative example ①, the second comparative example ②, and the split retard combustion mode ③ of the system of the embodiment. As can be seen from the bar graphs of FIG. 16, even under a condition where the A/F ratio is set to rich ($\lambda$<1), it is possible to realize the improved combustion operating mode that ensures high exhaust temperatures and low smoke emissions. Additionally, as can be seen from the rightmost bar graph of FIG. 16, during the split retard combustion mode, it is possible to realize relatively low HC emissions.

Furthermore, as previously discussed, the system of the embodiment widens the retardation limit of main combustion by appropriately rising the in-cylinder temperature by way of preliminary combustion, and thus it is possible to ensure stable combustion under a low-$\lambda$ condition and to realize high exhaust temperatures, even when the main injection timing, exactly, the start $t_{m1}$ of main injection "b" is retarded.

Referring now to FIGS. 17A–17D, there are shown the characteristic curves respectively indicating the exhaust temperature, smoke density, CO density, and HC density, during the main injection period. As appreciated, the greater the main injection period retards (in other words, the main combustion timing retards), the greater the ratio of premixed combustion to diffusion combustion increases. Even under the low-$\lambda$ condition, it is possible to realize remarkable smoke emissions suppression by retarding the main combustion timing as much as possible (see FIG. 17B). On the other hand, due to the retarded main combustion timing, the CO emissions density tends to become somewhat high (see FIG. 17C), whereas the HC emissions density can be held at the low level (see FIG. 17D). Additionally, by way of retardation of the main combustion timing, it is possible to realize higher exhaust temperatures (see FIG. 17A). That is, it is possible to properly control the exhaust temperature by properly changing the injection timing of main injection "b" for main combustion.

Figure 18:
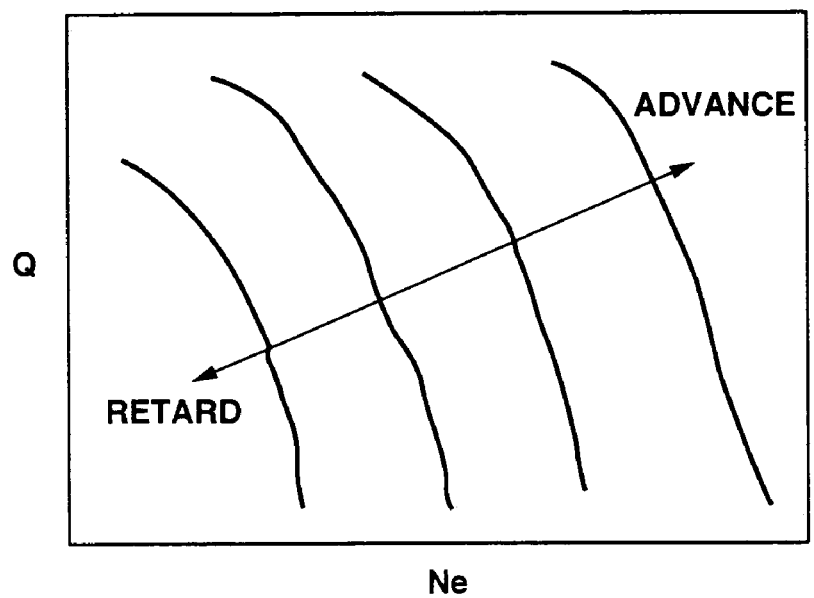
FIG. 18 is a characteristic map showing a desired fuel injection timing suitable for preliminary combustion.

Referring to FIG. 18, there is shown the predetermined preliminary injection timing characteristic map showing how a desired fuel injection timing for preliminary injection needed for preliminary combustion has to be varied relative to engine operating conditions, namely engine speed Ne and engine load Q.

Figure 19:
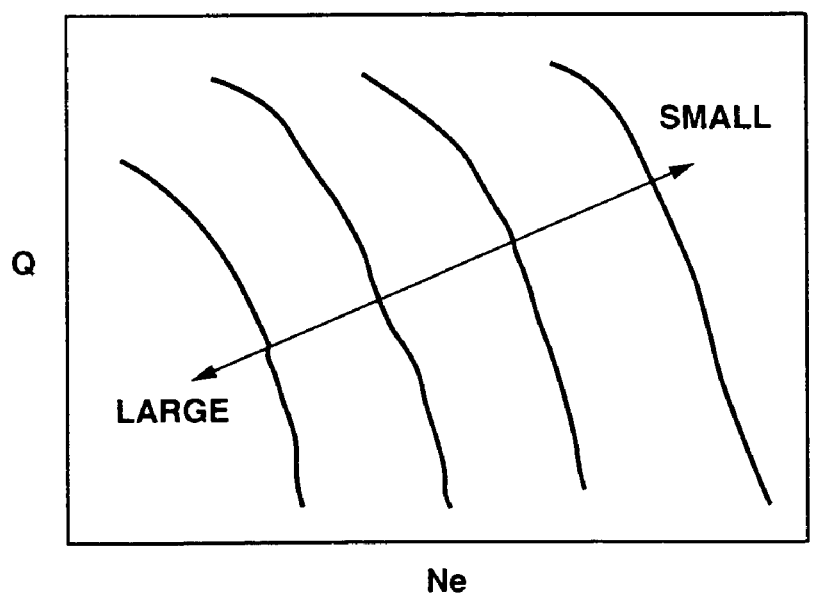
FIG. 19 is a characteristic map showing a desired fuel injection quantity for preliminary combustion.

Referring to FIG. 19, there is shown the predetermined preliminary injection quantity characteristic map showing how a desired fuel injection quantity for preliminary combustion has to be varied relative to engine operating conditions, namely engine speed Ne and engine load Q.

Figure 20:
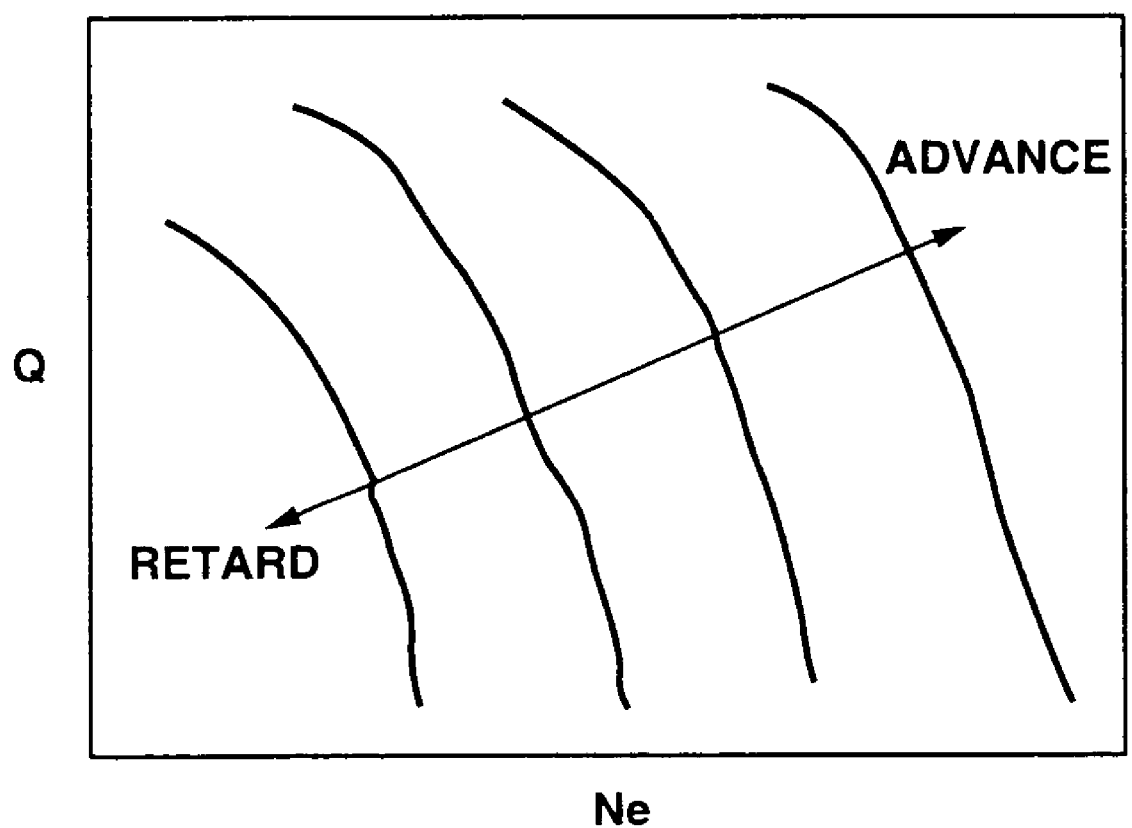
FIG. 20 is a characteristic map showing a desired fuel injection timing suitable for main combustion.

Referring to FIG. 20, there is shown the predetermined main injection timing characteristic map showing how a desired fuel injection timing for main injection needed for main combustion has to be varied relative to engine operating conditions, namely engine speed Ne and engine load Q, in order to realize a certain desired exhaust temperature. On the other hand, a desired fuel injection quantity for main combustion (in other words, a main injection quantity) is determined based on a desired $\lambda$ and a desired air quantity tQac, which is determined in accordance with the air quantity control routine (described later) of FIG. 25 containing torque compensation (torque increase) needed to compensate for an engine torque drop occurring due to main-combustion retardation during the split retard combustion mode.

Figures 21A, 21B:
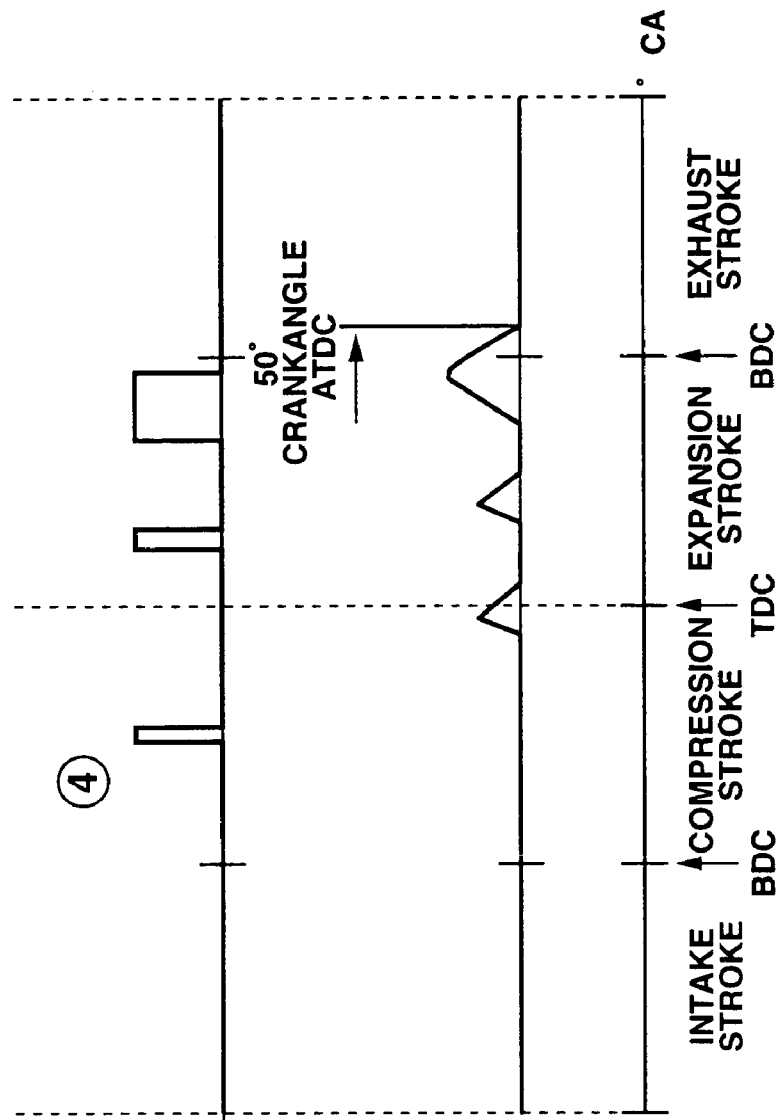
FIGS. 21A–21B are time charts showing a fuel injection pattern/combustion type in another split retard combustion mode (multi preliminary combustion plus main combustion mode) ④ of the system of the embodiment.

In particular, during low engine load operation, in order to achieve the desired exhaust temperature the heat release starting point $t_{m2}$ of main combustion tends to considerably retard, since the injection timing of main injection "b" is considerably retarded during low engine load operation (see the map of FIG. 20). Assuming that fuel is injected only once as preliminary injection and thus only one preliminary combustion occurs near TDC on the compression stroke under such a low engine load condition, there is a possibility that the in-cylinder temperature becomes less than the self-ignitable temperature value during the main injection period for main combustion operation. In such a case, that is, during low loads, as can be seen from the fuel injection pattern and heat release rate shown in FIGS. 21A–21B, it is possible to maintain the in-cylinder temperature above the self-ignitable temperature value by performing preliminary combustion two or more times, so that the heat-release time periods of two adjacent preliminary combustion operations are not overlapped with each other (see the comparatively small two-split ridged waveforms of FIG. 21B). In such a multi preliminary combustion plus main combustion mode ④ shown in FIGS. 21A–21B, it is preferable that at least one of the two or more preliminary combustion operations occurs near TDC on the compression stroke (see FIG. 21B). The multi preliminary combustion plus main combustion mode ④ shown in FIGS. 21A–21B (a combination of at least two preliminary combustion operations and main combustion operation split apart from each other) reconciles both of low smoke emissions and high exhaust temperatures, even under low engine load operation.

As discussed above, in presence of a request for low-$\lambda$ and high exhaust temperature for DPF regeneration and/or sulfur poisoning release, the system of the embodiment executes switching from the normal combustion mode to the split retard combustion mode.

Figure 22:
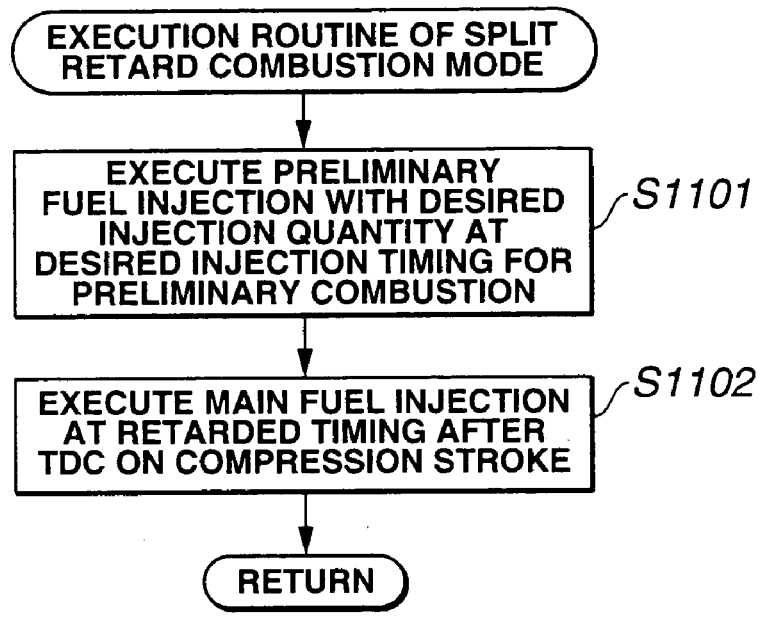
FIG. 22 is a flow chart showing a switching-to-split-retard-combustion-mode routine.

Concretely, mode switching to the split retard combustion mode is achieved in accordance with the flow chart shown in FIG. 22.

At step S1101 of FIG. 22, preliminary fuel injection needed for preliminary combustion is initiated and executed with a desired preliminary injection quantity determined or retrieved from the predetermined map shown in FIG. 19 at a desired preliminary injection timing determined or retrieved from the predetermined map shown in FIG. 18.

At step S1102, main fuel injection needed for main combustion is initiated and executed at a retarded injection timing (see the map of FIG. 20) after TDC on the compression stroke, with a desired main injection quantity increasingly compensated for torque compensation needed to compensate for the engine torque fall occurring due to the remarkable main injection timing retard. Such torque compensation is needed to minimize the engine torque difference before and after switching to the split retard combustion mode.

Figure 23:
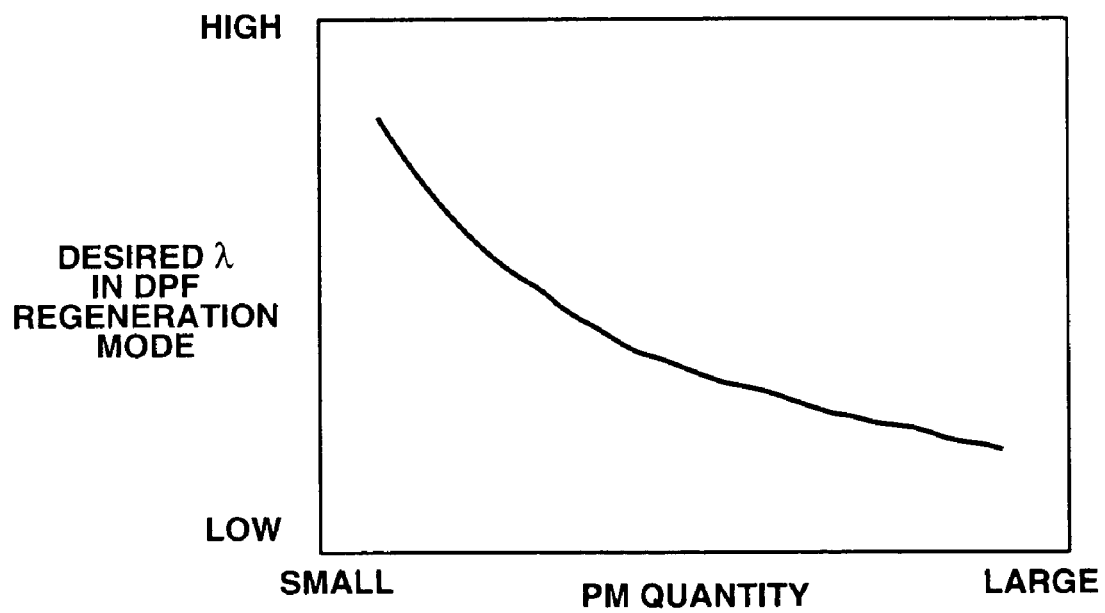
FIG. 23 is a characteristic diagram showing the relationship between a particulate-matter accumulation quantity (PM quantity) and a desired λ during DPF regeneration.

Returning to step S102 of FIG. 3, the exhaust λ is controlled to a desired value ranging from "1" to "1.4". During the DPF regeneration period, the desired value of the exhaust λ varies depending on the PM quantity. Therefore, first, the PM quantity is estimated by comparing the exhaust pressure of the DPF inlet side, detected by exhaust pressure sensor 26, to the reference exhaust pressure, determined based on the current engine operating conditions, such as the current engine speed and the current engine load. Next, a desired λ is determined based on the estimated PM quantity from the preprogrammed characteristic map of FIG. 23 showing how the desired λ has to be varied relative to the PM quantity. Details of A/F control executed to attain the desired λ will be described later in reference to the flow charts shown in FIG. 25 (air quantity control containing torque compensation) and FIG. 26 (fuel injection quantity control). Briefly, during the split retard combustion mode, the A/F control to attain the desired λ is executed, while simultaneously executing torque compensation needed to compensate for a torque decrease occurring due to main-combustion retardation.

At step S103, a check is made to determine whether the DPF temperature exceeds a predetermined DPF-regeneration period upper limit T22 (an upper limit of the desired DPF temperature during DPF regeneration). When the condition defined by DPF temperature>T22 is satisfied, the processor of control unit 20 determines that the DPF temperature exceeds upper limit T22 during the DPF regeneration mode, and thus the routine proceeds from step S103 to step S111, in order to advance the main injection timing and thus to decreasingly compensate for the exhaust temperature.

At step S111, a temperature deviation ΔT (=DPF temperature−T22) between the actual DPF temperature and upper limit T22 is calculated.

At step S112, a feedback gain G is calculated and determined based on temperature deviation ΔT. For the purpose of a rapid convergence of the actual DPF temperature to the desired temperature value, feedback gain G is set to increase, as temperature deviation ΔT increases. Conversely when temperature deviation ΔT reduces, feedback gain G is decreasingly compensated for, to prevent undesired overshoot.

At step S113, a phase-advanced amount (a feedback compensation amount) $t_{advanced}$ of main injection timing for main combustion is calculated by multiplying temperature deviation ΔT by feedback gain G, from the expression $t_{advanced}=\Delta T\times G$. As can be appreciated from the expression $t_{advanced}=\Delta T\times G$, as feedback compensation for main injection timing, the system of the embodiment uses proportional control in which the amount of corrective action is proportional to the amount of error (ΔT=DPF temperature−T22). In lieu thereof, the system of the embodiment may utilize integral control, derivative control, proportional-plus-integral control in which the control signal is a linear combination of the error signal and its integral, or proportional-plus-derivative control in which the control signal is a linear combination of the error signal and its derivative.

At step S114, the main injection timing is advanced by phase-advanced amount $t_{advanced}$, calculated through step S113, so as to lower the exhaust temperature. Thus, even when an undesirably excessive DPF temperature rise occurs, the system of the embodiment can rapidly drop the exhaust temperature and consequently protect or prevent DPF 14 from being damaged.

Returning to step S103, if the condition defined by DPF temperature>T22 is unsatisfied, that is, in case of DPF temperature≦T22, the routine proceeds from step S103 to step S104.

At step S104, a check is made to determine whether the DPF temperature is less than a predetermined DPF-regeneration period lower limit T21 (a lower limit of the desired DPF temperature during DPF regeneration). When the condition defined by DPF temperature<T21 is satisfied, the processor determines that the DPF temperature becomes less than lower limit T21 during the DPF regeneration mode, and thus the routine proceeds from step S104 to step S110.

At step S110, the main injection timing is retarded by a predetermined amount, to increasingly compensate for the exhaust temperature.

Returning to step S104, if the condition defined by DPF temperature<T21 is unsatisfied, that is, in case of DPF temperature≧T21, the routine proceeds from step S104 to step S105.

At step S105, a check is made to determine whether a predetermined time period $t_{dpfreg}$ has expired from the time when the DPF regeneration mode is initiated. Expiration of predetermined time period $t_{dpfreg}$ means that PM accumulated in DPF 14 has certainly burned and removed from DPF 14 and thus DPF regeneration has been completed. Therefore, when the answer to step S105 is affirmative (YES), that is, upon expiration of predetermined time period $t_{dpfreg}$, the routine proceeds from step S105 to step S106.

At step S106, the combustion mode is changed from the split retard combustion mode to the normal combustion mode, because of completion of DPF regeneration. In this manner heating operation of DPF 14 terminates.

At step S107, owing to completion of DPF regeneration, DPF regeneration period indicative flag $_{reg}$FLAG is reset (=0) At step S108, melting loss prevention operating mode indicative flag $_{rec}$FLAG is set (=1), since there is a possibility that the unburned particulate matter is instantaneously burned out owing to a rapid change (a rapid rise) in the exhaust λ in the event that the unburned PM still exists in DPF 14 after completion of DPF regeneration, and such instantaneous combustion of PM results in melting loss of DPF 14. After setting of flag $_{rec}$FLAG to "1", the melting loss prevention operating mode (described later in reference to the flow of FIG. 6) is initiated.

Figure 4:
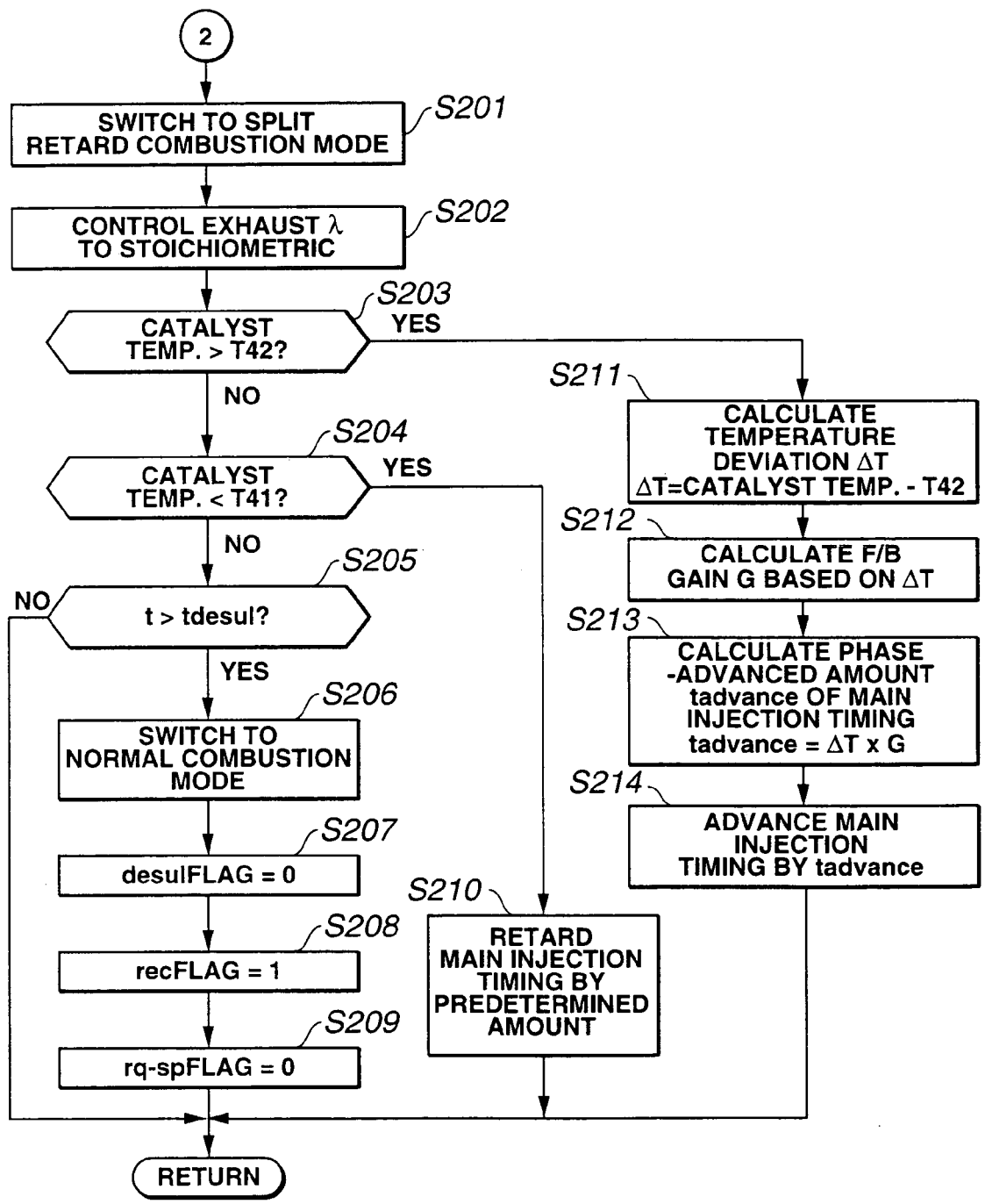
FIG. 4 is a flow chart showing a second subroutine (sulfur poisoning release mode) for exhaust emission control.

Referring now to FIG. 4, there is shown the sulfur poisoning release control routine. The sulfur poisoning release control routine of FIG. 4 is initiated under a condition that the S quantity of SOx in NOx trap catalyst 13 reaches predetermined S quantity S1, sulfur poisoning release request indicative flag $_{rq\text{-}desul}$FLAG is set (=1) through step S801 of FIG. 10, and thereafter sulfur-poisoning release period indicative flag $_{desul}$FLAG is set (=1) as a result of execution of the order-of-priority decision routine (described later) of FIG. 8.

At step S201, for the purpose of sulfur poisoning release (SOx regeneration), the combustion mode of engine 1 is switched from the normal lean combustion mode to the previously-discussed split retard combustion mode.

At step S202, the exhaust λ is controlled to a desired value (λ=1) corresponding to a stoichiometric A/F ratio (14.7:1). Details of A/F control executed to attain the desired λ will be described later in reference to the flow charts shown in FIG. 25 (air quantity control containing torque compensation) and FIG. 26 (fuel injection quantity control). Briefly, during the split retard combustion mode, the A/F control to attain the desired λ is executed, while simultaneously executing torque compensation needed to compensate for a torque decrease occurring due to main-combustion retardation.

At step S203, a check is made to determine whether the catalyst temperature exceeds a predetermined SOx-regeneration period upper limit T42 (an upper limit of the desired catalyst temperature during SOx regeneration). When the condition defined by catalyst temperature>T42 is satisfied, the processor of control unit 20 determines that the catalyst temperature exceeds upper limit T42 during the SOx regeneration mode, and thus the routine proceeds from step S203 to step S211, in order to advance the main injection timing and thus to decreasingly compensate for the exhaust temperature.

At step S211, a temperature deviation ΔT (=catalyst temperature−T42) between the actual catalyst temperature and upper limit T42 is calculated.

At step S212, a feedback gain G is calculated and determined based on temperature deviation ΔT. For the purpose of a rapid convergence of the actual catalyst temperature value to the desired temperature value, feedback gain G is set to increase, as temperature deviation ΔT increases. Conversely when temperature deviation ΔT reduces, feedback gain G is decreasingly compensated for, to prevent undesired overshoot.

At step S213, a phase-advanced amount (a feedback compensation amount) $t_{advanced}$ of main injection timing for main combustion is calculated by multiplying temperature deviation ΔT by feedback gain G, from the expression $t_{advanced}$=ΔT×G. As can be appreciated from the expression $t_{advance}$=ΔT×G, as feedback compensation for main injection timing, the system of the embodiment uses proportional control in which the amount of corrective action is proportional to the amount of error (ΔT=catalyst temperature−T42). In lieu thereof, the system of the embodiment may utilize integral control, derivative control, proportional-plus-integral control in which the control signal is a linear combination of the error signal and its integral, or proportional-plus-derivative control in which the control signal is a linear combination of the error signal and its derivative.

At step S214, the main injection timing is advanced by phase-advanced amount $t_{advanced}$, calculated through step S213, so as to lower the exhaust temperature. Thus, even when an undesirably excessive catalyst temperature rise occurs, the system of the embodiment can rapidly drop the exhaust temperature and consequently protect or prevent NOx trap catalyst 13 from being damaged.

Returning to step S203, if the condition defined by catalyst temperature>T42 is unsatisfied, that is, in case of catalyst temperature≦T42, the routine proceeds from step S203 to step S204.

At step S204, a check is made to determine whether the catalyst temperature is less than a predetermined SOx-regeneration period lower limit T41 (a lower limit of the desired catalyst temperature during SOx regeneration). When the condition defined by catalyst temperature<T41 is satisfied, the processor determines that the catalyst temperature becomes less than lower limit T41 during the SOx regeneration mode, and thus the routine proceeds from step S204 to step S210.

At step S210, the main injection timing is retarded by a predetermined amount, to increasingly compensate for the exhaust temperature. Returning to step S204, if the condition defined by catalyst temperature<T41 is unsatisfied, that is, in case of catalyst temperature≧T41, the routine proceeds from step S204 to step S205.

At step S205, a check is made to determine whether a predetermined time period $t_{desul}$ has expired from the time when the SOx regeneration mode is initiated. Expiration of predetermined time period $t_{desul}$ means that SOx trapped by NOx trap catalyst 13 has certainly desorbed therefrom and thus SOx regeneration (sulfur poisoning release) has been completed. Therefore, when the answer to step S205 is affirmative (YES), that is, upon expiration of predetermined time period $t_{desul}$, the routine proceeds from step S205 to step S206.

At step S206, the combustion mode is changed from the split retard combustion mode to the normal combustion mode, because of completion of SOx regeneration. In this manner heating operation of NOx trap catalyst 13 terminates.

At step S207, owing to completion of SOx regeneration, sulfur-poisoning release period indicative flag $_{desul}$FLAG is reset (=0).

At step S208, melting loss prevention operating mode indicative flag $_{rec}$FLAG is set (=1), since there is a possibility that the unburned particulate matter is instantaneously burned out owing to a rapid change (a rapid rise) in the exhaust λ in the event that the unburned PM exists in DPF 14 under such high temperature conditions after completion of SOx regeneration, and such instantaneous combustion of PM results in melting loss of DPF 14. After setting of flag $_{rec}$FLAG to "1", the melting loss prevention operating mode (described later in reference to the flow of FIG. 6) is initiated.

At step S209, rich spike request indicative flag $_{rq-sp}$FLAG is reset to "0". This is because NOx trap catalyst 13 is subjected to the stoichiometric combustion for a long time period during the sulfur poisoning release mode, and thus there is an increased tendency for the NOx desorption-purification mode (NOx regeneration mode or rich spike mode) to be simultaneously performed. If the rich spike mode (NOx regeneration mode) has already been required and thus rich spike request indicative flag $_{rq-sp}$FLAG has already been set (=1), it is necessary to inhibit the rich spike mode. For this reason, resetting of rich spike request indicative flag $_{rq-sp}$FLAG is made at step S209.

Figure 5:
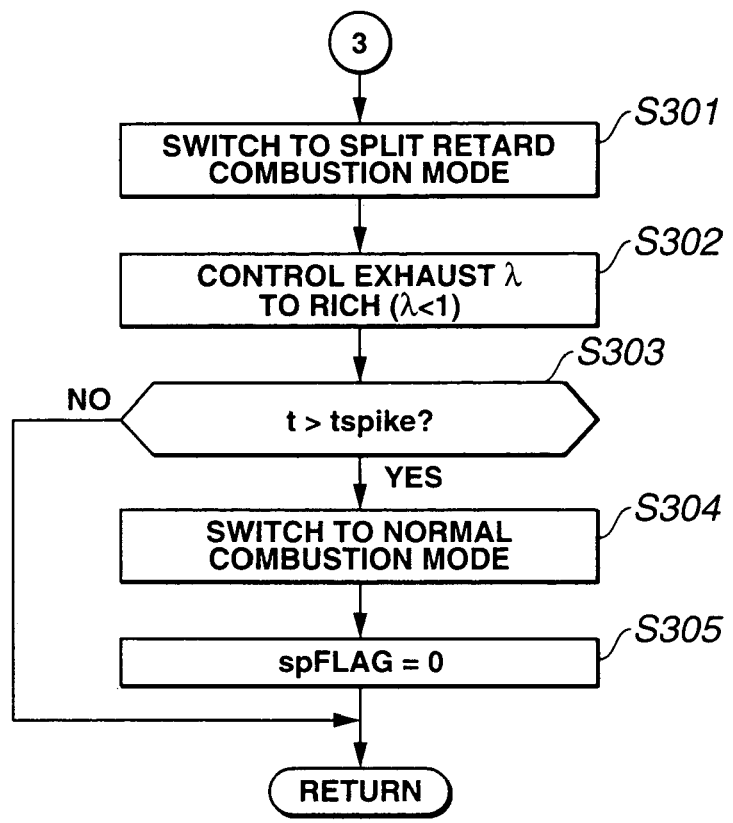
FIG. 5 is a flow chart showing a third subroutine (rich spike mode) for exhaust emission control.

Referring now to FIG. 5, there is shown the rich spike control routine (the NOx desorption-purification control routine or NOx regeneration control routine). The rich spike control routine of FIG. 5 is initiated under a condition that the NOx quantity of NOx trap catalyst 13 reaches predetermined NOx quantity NOx1, rich spike request indicative flag $_{rq-sp}$FLAG is set (=1) through step S901 of FIG. 11, and thereafter rich spike period indicative flag $_{sp}$FLAG is set (=1) as a result of execution of either the order-of-priority decision routine (described later) of FIG. 7 or the order-of-priority decision routine (described later) of FIG. 8.

At step S301, for the purpose of NOx regeneration, the combustion mode of engine 1 is switched from the normal lean combustion mode to the previously-discussed split retard combustion mode.

At step S302, the exhaust λ is controlled to a desired value (λ<1) corresponding to a rich A/F ratio. Details of A/F control executed to attain the desired λ (<1) will be described later in reference to the flow charts shown in FIG. 25 (air quantity control containing torque compensation) and FIG. 26 (fuel injection quantity control). Briefly, during the split retard combustion mode, the A/F control to attain the desired λ is executed, while simultaneously executing torque compensation needed to compensate for a torque decrease occurring due to main-combustion retardation.

At step S303, a check is made to determine whether a predetermined time period $t_{spike}$ has expired from the time when the NOx regeneration mode is initiated. Expiration of predetermined time period $t_{spike}$ means that NOx trapped by NOx trap catalyst 13 has certainly desorbed therefrom and thus NOx regeneration (NOx desorption-purification) has been completed. Therefore, when the answer to step S303 is affirmative (YES), that is, upon expiration of predetermined time period $t_{spike}$, the routine proceeds from step S303 to step S304.

At step S304, the combustion mode is changed from the split retard combustion mode to the normal combustion mode, because of completion of NOx regeneration. As a matter of course, at the same time, the rich spike mode, creating a transiently considerably richened A/F ratio ($\lambda<1$), terminates.

At step S305, owing to completion of NOx regeneration, rich spike period indicative flag $_{sp}$FLAG is reset (=0).

Figure 6:
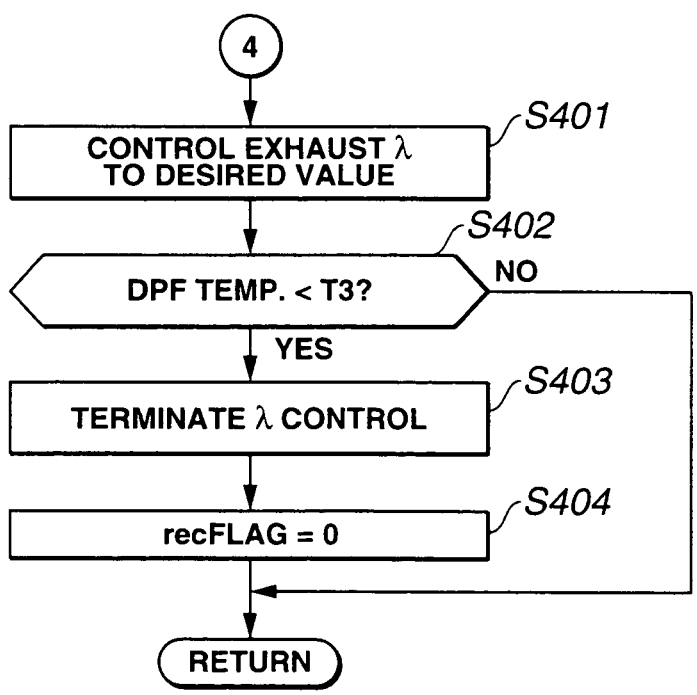
FIG. 6 is a flow chart showing a fourth subroutine (melting loss prevention mode) for exhaust emission control.

Referring now to FIG. 6, there is shown the DPF melting loss prevention control routine. The DPF melting loss prevention control routine of FIG. 6 is initiated under a condition that melting loss prevention operating mode indicative flag $_{rec}$FLAG is set (=1) after completion of DPF regeneration as a result of execution of the routine of FIG. 3 or melting loss prevention operating mode indicative flag$_{rec}$ FLAG is set (=1) after completion of SOx regeneration (sulfur poisoning release) as a result of execution of the routine of FIG. 4. As previously described, there is a possibility that unburned PM existing in DPF 14 is instantaneously burned out if the exhaust $\lambda$ is rapidly changed to lean ($\lambda>1$) under high temperature conditions just after completion of DPF regeneration, and thus such instantaneous combustion of PM results in melting loss of DPF 14.

Thus, at step S401, the exhaust $\lambda$ is controlled to the desired value ($\lambda \leq 1.4$). During the DPF melting loss prevention mode, it is desirable to control or keep the exhaust temperature at comparatively low temperature values. Therefore, the exhaust $\lambda$ is controlled to the desired value by way of the normal combustion mode instead of using the split retard combustion mode.

At step S402, a check is made to determine whether the DPF temperature becomes less than a predetermined temperature value T3, for example 500° C., that there is no risk of initiating rapid oxidation of PM accumulated in DPF 14. When the answer to step S402 is negative (DPF temperature$\geq$T3), the system repeatedly continuously executes the exhaust $\lambda$ control ($\lambda \leq 1.4$). Conversely when the answer to step S402 is affirmative (DPF temperature<T3), the processor of control unit 20 determines that it is possible to avoid melting loss (melt-down) of DPF 14 even when the concentration of oxygen, exactly, the percentage of oxygen contained within the engine exhaust gases, becomes equal to that of the atmosphere. Thus, in case of DPF temperature<T3, the routine proceeds from step S402 to step S403.

At step S403, the exhaust $\lambda$ control ($\lambda \leq 1.4$) terminates, since there is a less possibility of DPF melting loss (DPF melt-down) under the condition of DPF temperature<T3.

At step S404, simultaneously with termination of the DPF melting loss prevention mode, melting loss prevention operating mode indicative flag $_{rec}$FLAG is reset (=0).

Figure 7:
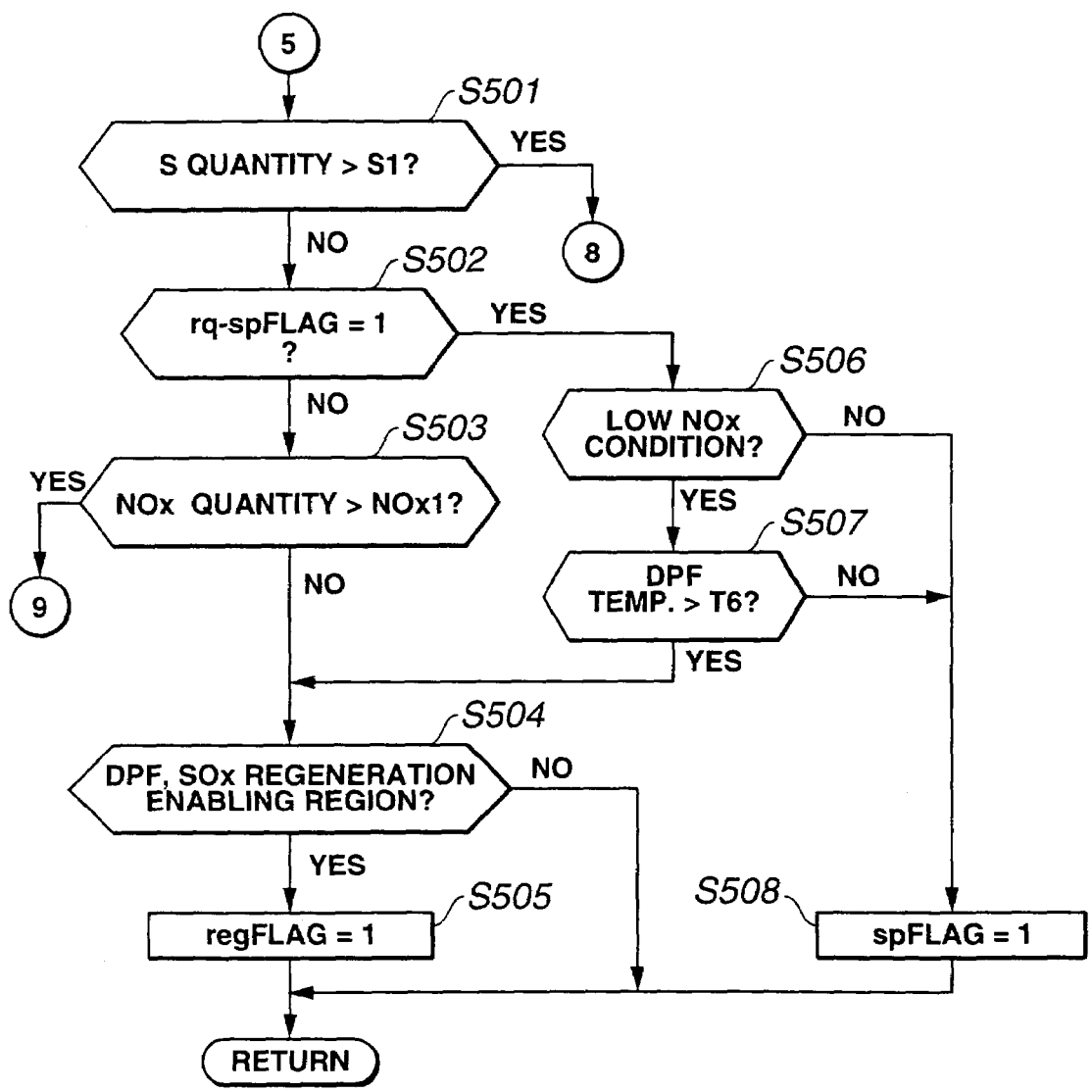
FIG. 7 is a flow chart showing a fifth subroutine (order-of-priority decision routine in presence of a request for DPF regeneration) for exhaust emission control.

Referring now to FIG. 7, there is shown the order-of-priority decision routine executed in presence of the request for DPF regeneration (with DPF-regeneration request indicative flag $_{rq\text{-}DPF}$FLAG set (=1)). Concretely, when DPF regeneration is required (see the flow from step S601 of FIG. 8 through step S701 of FIG. 9 to step S10 of FIG. 2), the order-of-priority decision routine of FIG. 7 is initiated. The order-of-priority decision routine of FIG. 7 is executed to determine whether priority should be given to which of (i) DPF regeneration, (ii) NOx regeneration (rich spike mode), and (iii) SOx regeneration (sulfur poisoning release mode), when the request for SOx regeneration (sulfur poisoning release mode) and the request for NOx regeneration (rich spike mode) occur simultaneously, in presence of the request for DPF regeneration.

At step S501, in a similar manner to step S13 of FIG. 2, a check is made to determine whether the SOx quantity reaches predetermined SOx quantity S1 after the request for DPF regeneration has occurred and the flag $_{rq\text{-}DPF}$FLAG has set. When the answer to step S501 is affirmative (the current SOx quantity>S1), the routine flows from step S501 to step S801 of FIG. 10, so as to set sulfur poisoning release request indicative flag $_{rq\text{-}desul}$FLAG to "1". Conversely when the answer to step S501 is negative (the current SOx quantity$\leq$S1), the routine proceeds from step S501 to step S502.

At step S502, a check is made to determine whether rich spike request indicative flag $_{rq\text{-}sp}$FLAG is set (=1). When the request for NOx desorption-purification (rich spike mode) is absent ($_{rq\text{-}sp}$FLAG=0), the routine proceeds from step S502 to step S503.

At step S503, in a similar manner to step S14 of FIG. 2, a check is made to determine whether the NOx quantity reaches predetermined NOx quantity NOx1 after the request for DPF regeneration has occurred and thus the flag $_{rq\text{-}DPF}$FLAG has set. When the answer to step S503 is affirmative (the current NOx quantity>NOx1), the routine flows from step S503 to step S901 of FIG. 11, so as to set rich spike request indicative flag $_{rq\text{-}sp}$FLAG to "1". Conversely when the answer to step S503 is negative (the current NOx quantity$\leq$NOx1), the routine proceeds from step S503 to step S504.

Figure 24:
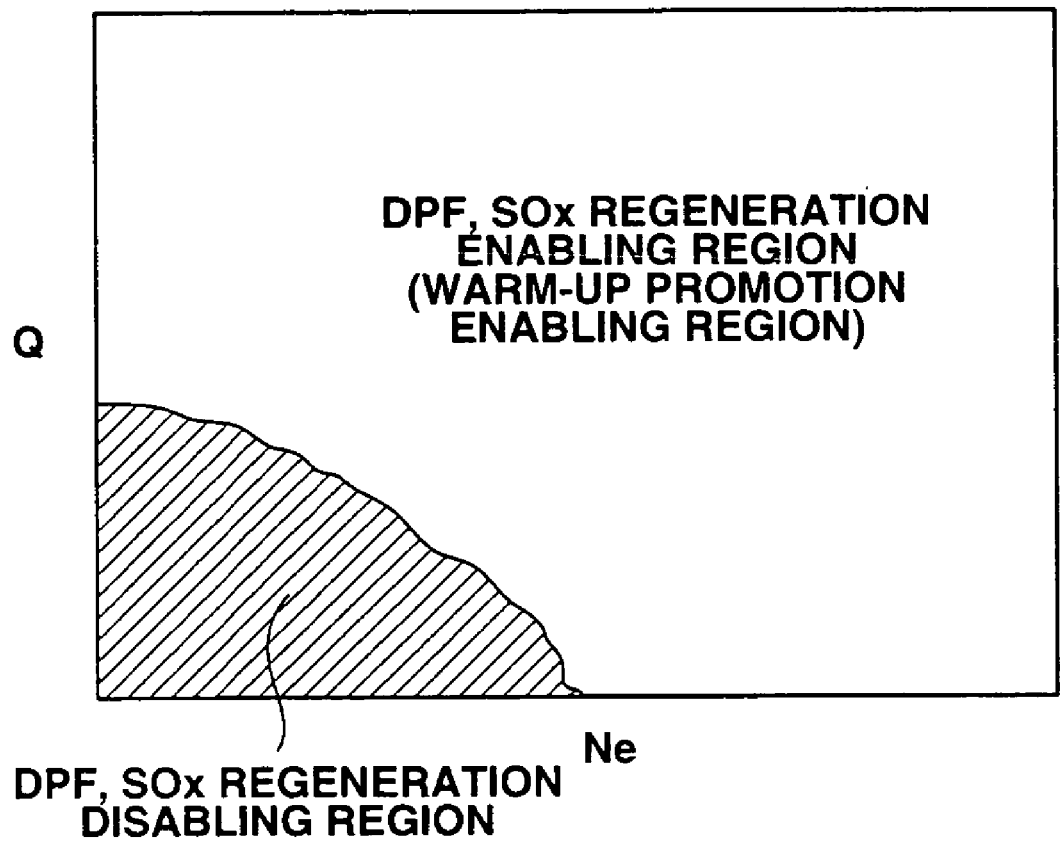
FIG. 24 is a characteristic diagram showing the relationship between a DPF-regeneration and sulfur-poisoning-release enabling region (DPF, SOx regeneration enabling region) and a DPF-regeneration and sulfur-poisoning-release disabling region (DPF, SOx regeneration disabling region).

At step S504, a check is made to determine whether the current engine operating range is within the preprogrammed DPF-regeneration and sulfur-poisoning-release enabling region (DPF, SOx regeneration enabling region). As can be seen from the predetermined Ne-Q versus DPF, SOx regeneration enabling region characteristic diagram of FIG. 24, the DPF, SOx regeneration enabling region is set outside of low-speed and low-load operating range in which a margin for an exhaust temperature rise is relatively small and a margin for deterioration in exhaust performance does not exceed an allowable level. In other words, the DPF, SOx regeneration disabling region is set within the low-speed and low-load operating range. When the answer to step S504 is affirmative (YES), and thus the current engine operating range is within the preprogrammed DPF, SOx regeneration enabling region, the routine proceeds from step S504 to step S505.

At step S505, DPF regeneration period indicative flag $_{reg}$FLAG is set (=1). As a result of this, the DPF regeneration mode is preferentially executed.

Returning to step S502, if the request for NOx desorption-purification (rich spike mode) is present ($_{rq\text{-}sp}$FLAG=1), the processor of control unit 20 determines that the request for DPF regeneration and the request for NOx regeneration are both present, and thus the routine proceeds from step S502 to step S506.

At step S506, a check is made to determine whether the current engine operating condition is conditioned in a low-NOx-emissions condition, such as a steady-state operating condition. When the answer to step S506 is affirmative (YES), the processor determines that there is a less deterioration in exhaust emissions of the exhaust tailpipe even when the NOx regeneration mode for NOx trap catalyst 13 is initiated with a time lag. Thus, the processor decides that priority should be given to DPF regeneration by which the drivability may be greatly affected. For the reasons discussed above, under low-NOx emissions condition, the routine flows from step S506 to step S507. Conversely when the answer to step S506 is negative (NO), the processor determines that it is necessary to prevent a remarkable deterioration in exhaust emissions of the exhaust tailpipe under high-NOx emissions condition. Thus, the processor decides that priority should be given to NOx regeneration. Thus, under high-NOx emissions condition, the routine flows from step S506 to step S508.

At step S508, rich spike period indicative flag $_{sp}$FLAG is set (=1), and thus the NOx regeneration mode is preferentially executed.

At step S507, a check is made to determine whether the DPF temperature exceeds a predetermined oxidation catalyst activation temperature value T6 that is required for activating the oxidation catalyst provided in DPF 14. As may be appreciated, when starting to rise the exhaust temperature under the condition of the DPF temperature below predetermined temperature value T6, it takes a long time until the DPF regeneration enabling temperature is reached. This may deteriorate exhaust emissions of the exhaust tailpipe. Thus, under the condition of the DPF temperature below predetermined temperature value T6, priority should be given to NOx regeneration. Thus, when DPF temperature≦T6, the routine also flows from step S507 to step S508. At step S508, rich spike period indicative flag $_{sp}$FLAG is set (=1), and thus the NOx regeneration mode is preferentially executed.

Conversely when the answer to step S507 is affirmative (YES), that is, when DPF temperature>T6, the routine flows from step S507 via step S504 to step S505, so as to set DPF regeneration period indicative flag $_{reg}$FLAG, and consequently to initiate the DPF regeneration mode preferentially.

Figure 8:
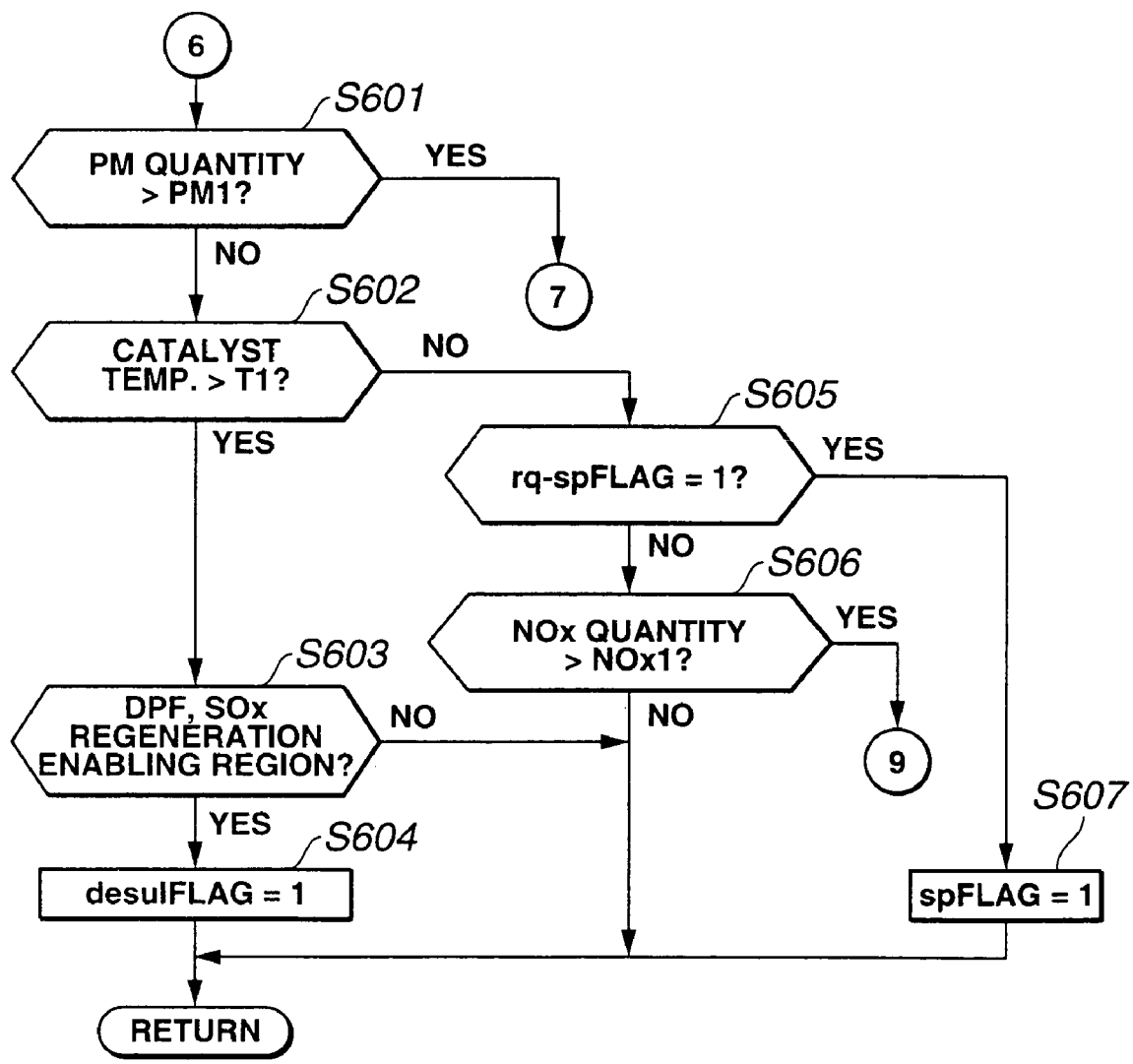
FIG. 8 is a flow chart showing a sixth subroutine (order-of-priority decision routine in presence of a request for sulfur poisoning release) for exhaust emission control.
Figure 9:
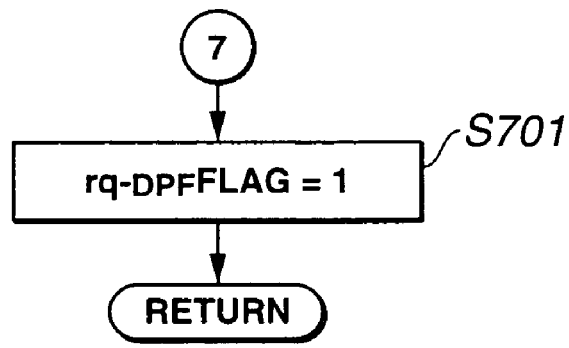
FIG. 9 is a flow chart showing a seventh subroutine (DPF-regeneration request indicative flag $_{rq\text{-}DPF}$FLAG setting routine) for exhaust emission control.
Figure 10:
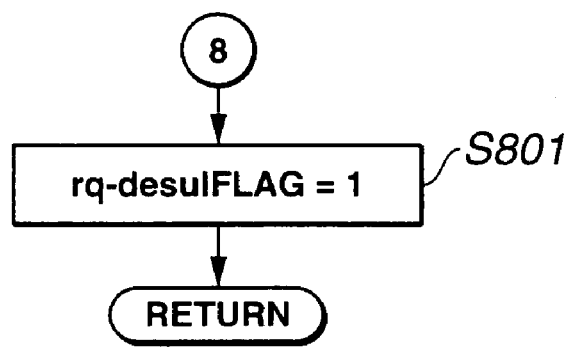
FIG. 10 is a flow chart showing an eighth subroutine (sulfur poisoning release request indicative flag rq-desulFLAG setting routine) for exhaust emission control.
Figure 11:
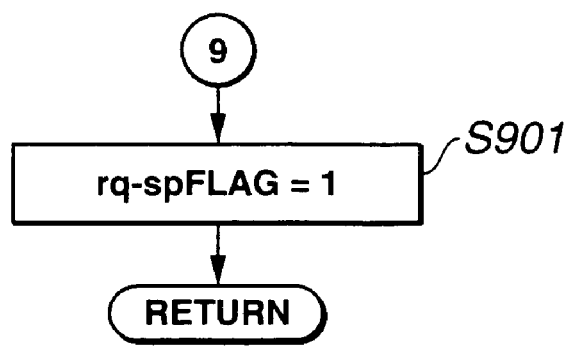
FIG. 11 is a flow chart showing a ninth subroutine (rich spike request indicative flag $_{rq\text{-}sp}$FLAG setting routine) for exhaust emission control.

Referring now to FIG. 8, there is shown the order-of-priority decision routine executed in presence of the request for SOx regeneration (with sulfur poisoning release request indicative flag $_{rq\text{-}desul}$FLAG set (=1)). Concretely, when SOx regeneration is required (see the flow from step S501 of FIG. 7 through step S801 of FIG. 10 to step S11 of FIG. 2), the order-of-priority decision routine of FIG. 8 is initiated. The order-of-priority decision routine of FIG. 8 is executed to determine whether priority should be given to which of (i) SOx regeneration (sulfur poisoning release mode), (ii) NOx regeneration (rich spike mode), and (iii) DPF regeneration, when the request for NOx regeneration (rich spike mode) and the request for DPF regeneration occur simultaneously, in presence of the request for SOx regeneration (sulfur poisoning release mode).

At step S601, in a similar manner to step S12 of FIG. 2, a check is made to determine whether the PM quantity reaches predetermined PM quantity PM1 after the request for sulfur poisoning release has occurred and the flag $_{rq\text{-}desul}$FLAG has set. When the answer to step S601 is affirmative (the current PM quantity>PM1), the routine flows from step S601 to step S701 of FIG. 9, so as to set DPF-regeneration request indicative flag $_{rq\text{-}DPF}$FLAG to "1". Conversely when the answer to step S601 is negative (the current PM quantity≦PM1), the routine proceeds from step S601 to step S602.

At step S602, a check is made to determine whether the catalyst temperature exceeds a predetermined temperature value T1. As may be appreciated, when starting to rise the exhaust temperature under the condition of the catalyst temperature below predetermined temperature value T1, it takes a long time until the sulfur-poisoning-release enabling temperature is reached. This may deteriorate exhaust emissions of the exhaust tailpipe. Thus, under the condition of the catalyst temperature below predetermined temperature value T1, priority should be given to NOx regeneration. Thus, when catalyst temperature≦T1, the routine proceeds from step S602 to step S605. Conversely when the answer to step S602 is affirmative (YES), that is, when catalyst temperature>T1, the routine flows from step S602 to step S603.

At step S603, a check is made to determine whether the current engine operating range is within the preprogrammed DPF-regeneration and sulfur-poisoning-release enabling region (DPF, SOx regeneration enabling region). When the answer to step S603 is affirmative (YES), and thus the current engine operating range is within the preprogrammed DPF, SOx regeneration enabling region, the routine proceeds from step S603 to step S604.

At step S604, sulfur poisoning release request indicative flag $_{rq\text{-}desul}$FLAG is set (=1). As a result of this, the sulfur poisoning release mode (SOx regeneration) is preferentially executed.

At step S605, a check is made to determine whether rich spike request indicative flag $_{rq\text{-}sp}$FLAG is set (=1). When the request for NOx desorption-purification (rich spike mode) is present ($_{rq\text{-}sp}$FLAG=1), the routine proceeds from step S605 to step S607.

At step S607, rich spike period indicative flag $_{sp}$FLAG is set (=1), and thus the NOx regeneration mode is preferentially executed.

Returning to step S605, if the request for NOx desorption-purification (rich spike mode) is absent ($_{rq\text{-}sp}$FLAG=0), the routine flows from step S605 to step S606.

At step S606, in a similar manner to step S14 of FIG. 2 or step S503 of FIG. 7, a check is made to determine whether the NOx quantity reaches predetermined NOx quantity NOx1 after the request for sulfur poisoning release has occurred and thus the flag $_{rq\text{-}desul}$FLAG has set. When the answer to step S606 is affirmative (the current NOx quantity>NOx1), the routine flows from step S606 to step S901 of FIG. 11, so as to set rich spike request indicative flag $_{rq\text{-}sp}$FLAG to "1".

Figure 12:
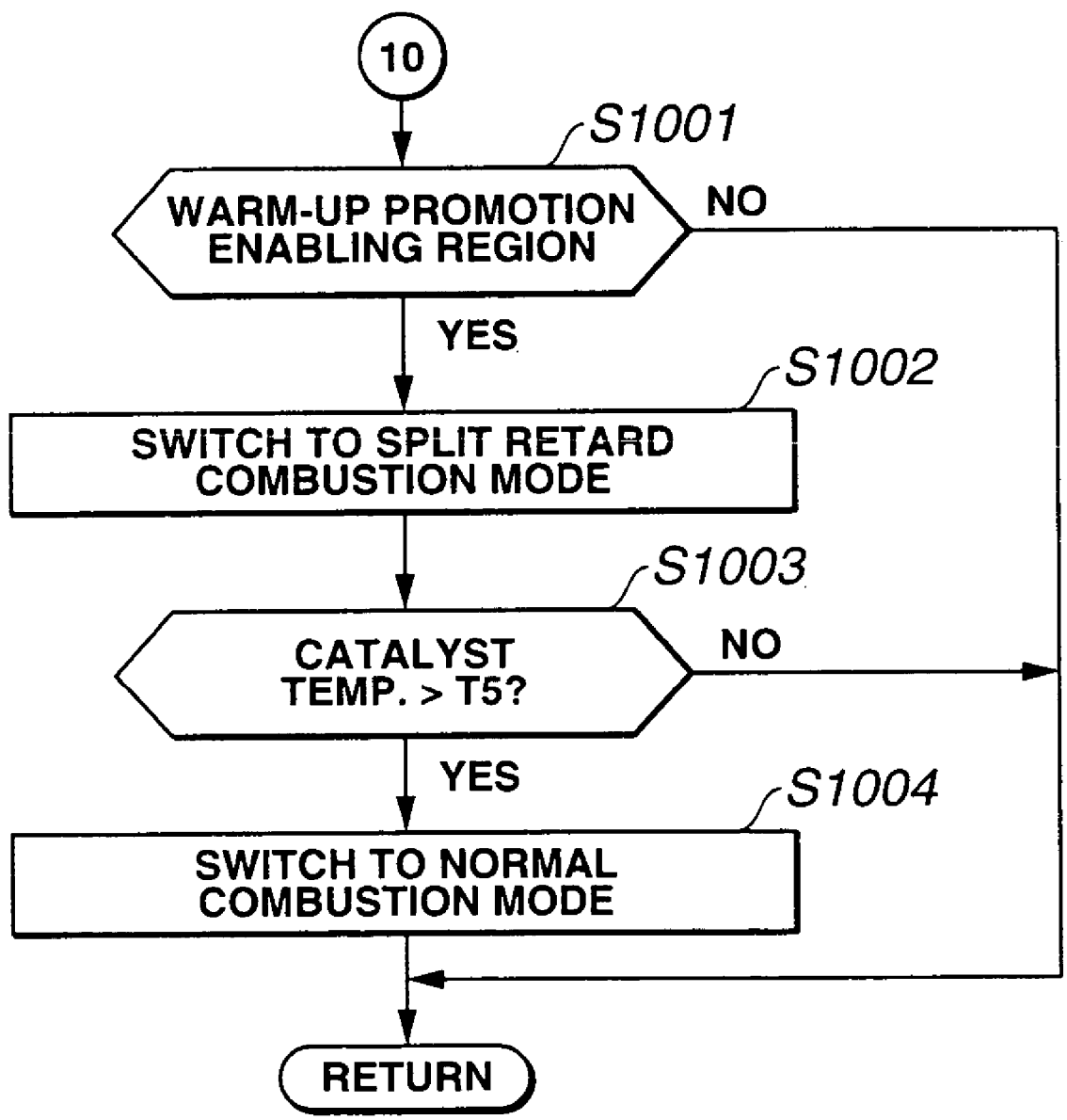
FIG. 12 is a flow chart showing a tenth subroutine (warm-up promotion mode) for exhaust emission control.
Figure 17A:
FIGS. 17A–17D are characteristic curves respectively showing the exhaust temperature characteristic, the smoke concentration characteristic, the carbon monoxide concentration characteristic, and the hydrocarbons concentration characteristic, during the main injection period.
Figure 17B:
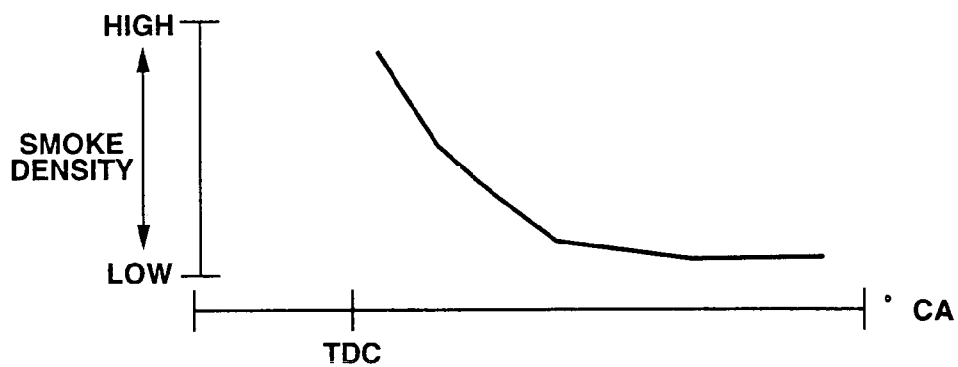
Figure 17C:
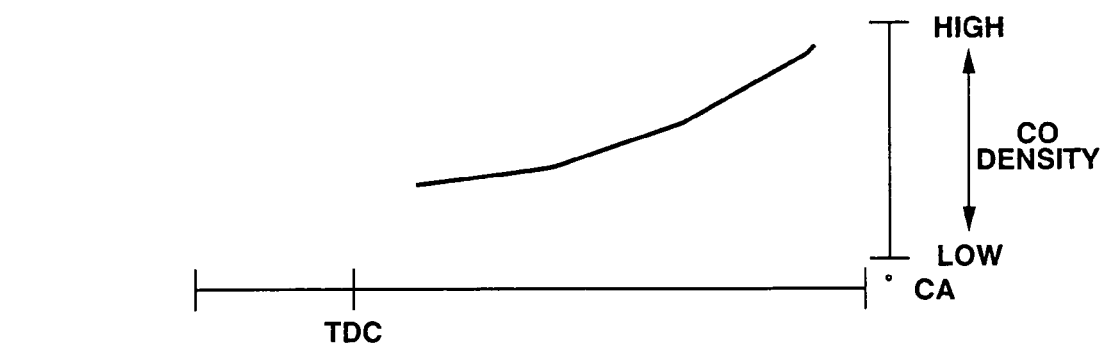
Figure 17D:
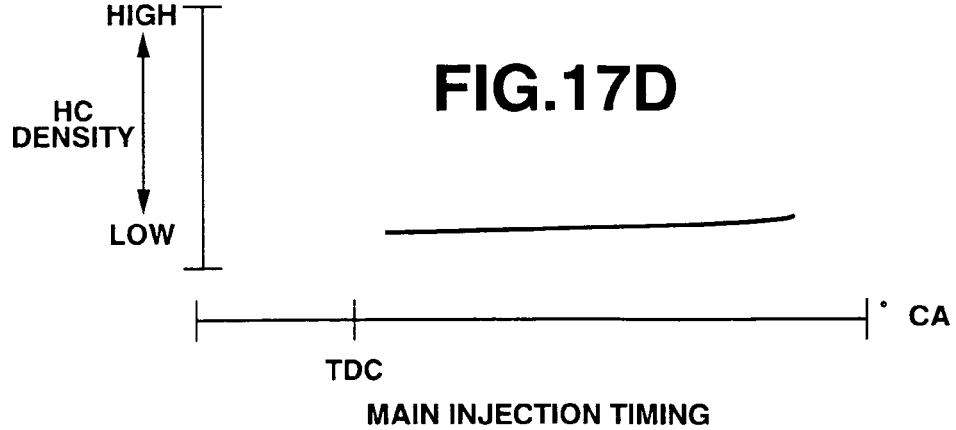

Referring now to FIG. 12, there is shown the warm-up promotion control routine. Concretely, when the catalyst temperature is less than or equal to a predetermined catalyst activation temperature value T5, the warm-up promotion control routine of FIG. 12 is initiated for rapid activation of the NOx trap catalyst.

At step S1001, a check is made to determine whether the current engine operating range is within a preprogrammed warm-up promotion engine-operation enabling region (simply, warm-up promotion enabling region). In the system of the embodiment, the warm-up promoting operation of engine 1 is achieved by way of the split retard combustion mode (see FIGS. 15A–15B, and 21A–21B). Therefore, the warm-up promotion enabling region can be regarded as to be almost equivalent to the split retard combustion mode enabling engine-operating range. As previously described, the system of the embodiment utilizes the split retard combustion mode, for DPF regeneration, sulfur poisoning release, or NOx regeneration. That is, the warm-up promotion enabling region can be regarded as to be almost equivalent to the previously-discussed preprogrammed DPF-regeneration and sulfur-poisoning-release enabling region. For the reasons set out above, in the system of the shown embodiment, the predetermined warm-up promotion enabling region is set to be identical to the preprogrammed DPF, SOx regeneration enabling region shown in FIG. 24. When the answer to step S1001 is affirmative (YES), and thus the current engine operating range is within the predetermined warm-up promotion enabling region (the preprogrammed DPF, SOx regeneration enabling region of FIG. 24), the routine proceeds from step S1001 to step S1002.

At step S1002, for warm-up promotion, the combustion mode of engine 1 is switched from the normal lean combustion mode to the split retard combustion mode. After switching to the split retard combustion mode, it is possible to rapidly rise the exhaust temperature. This effectively promotes a rapid catalyst warm-up (a rapid catalyst activation). During the warm-up promotion mode, the exhaust $\lambda$ is controlled to the desired value. Details of A/F control executed to attain the desired $\lambda$ will be described later in reference to the flow charts shown in FIG. 25 (air quantity control containing torque compensation) and FIG. 26 (fuel injection quantity control). Briefly, during the split retard combustion mode for catalyst warm-up purposes, the A/F control to attain the desired $\lambda$ is executed, while simultaneously executing torque compensation needed to compensate for a torque decrease occurring due to main-combustion retardation.

At step S1003, a check is made to determine whether the catalyst temperature of NOx trap catalyst 13 is greater than predetermined catalyst activation temperature value T5. When the answer to step S1003 is affirmative (catalyst temperature>T5), the routine proceeds from step S1003 to step S1004.

At step S1004, the combustion mode is changed from the split retard combustion mode to the normal combustion mode, because of completion of catalyst warm-up promotion. In this manner, heating operation of NOx trap catalyst 13 terminates.

Figure 25:
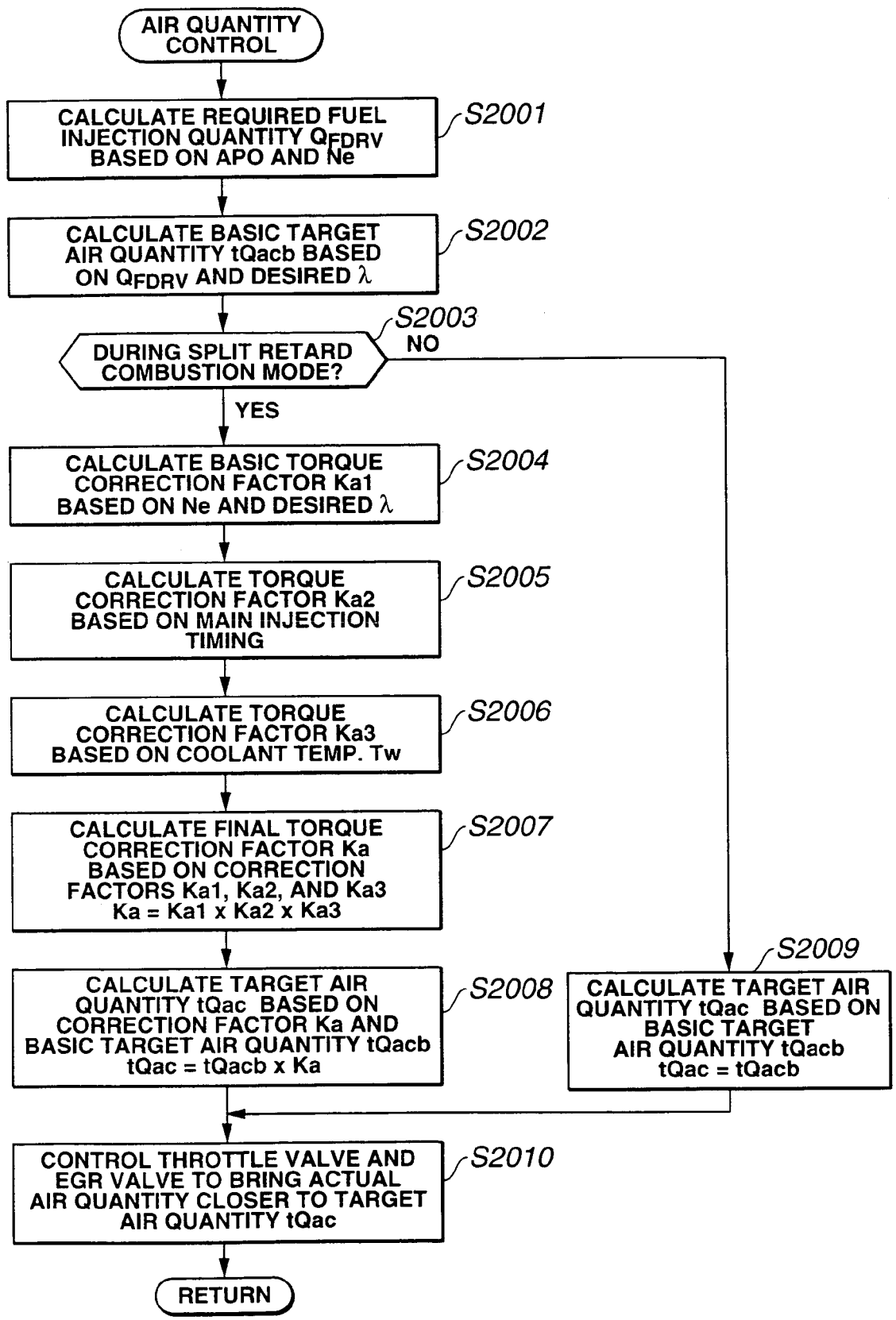
FIG. 25 is a flow chart showing air quantity control containing engine torque compensation.
Figure 26:
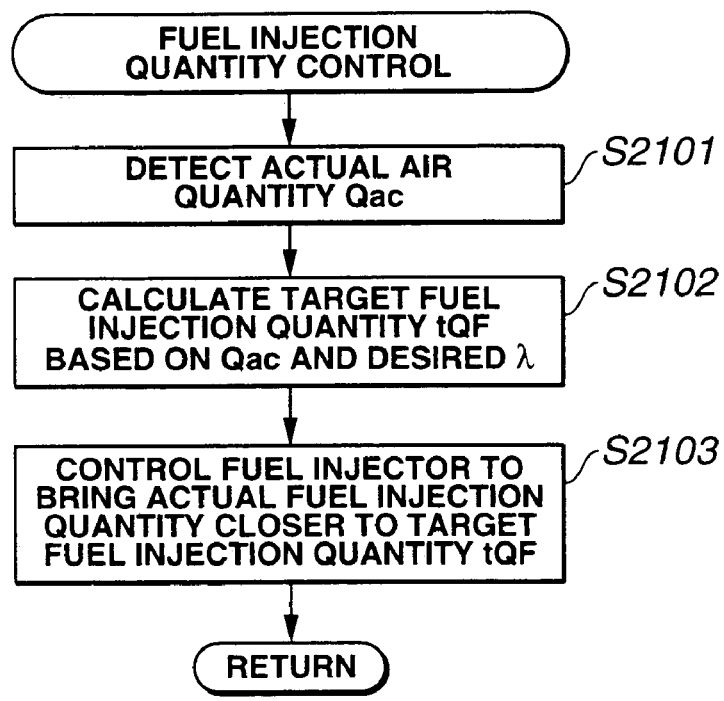
FIG. 26 is a flow chart showing fuel injection quantity control.

Next, details of A/F control executed to attain the desired $\lambda$ are described hereunder in reference to the flow charts shown in FIG. 25 (air quantity control containing torque compensation) and FIG. 26 (fuel injection quantity control). During the split retard combustion mode, the engine torque tends to decrease, and therefore it is important to execute optimum torque compensation for minimizing the engine torque difference before and after switching to the split retard combustion mode, while keeping the desired $\lambda$. The higher the rate of exhaust temperature rise, caused by retardation of the main injection timing for main combustion (see FIG. 17A), the greater the engine torque decrease becomes. The countermeasure against such an engine torque drop occurring owing to the main-injection-timing retard is necessary. In particular, during the warm-up period, even when the main fuel injection timing for main combustion is the same, there is an increased tendency that locally low-temperature portions exist within the combustion chamber. Such locally low-temperature portions cause the undesirably lowered combustion efficiency, thus resulting in the remarkable engine torque drop. The countermeasure against such a problem is also necessary.

Referring now to FIG. 25, there is shown the air quantity control routine containing engine torque compensation. The air quantity control routine of FIG. 25 is also executed as time-triggered interrupt routines to be triggered every predetermined time intervals.

At step S2001, a required fuel injection quantity $Q_{FDRV}$, corresponding to a required engine torque, is calculated or determined based on accelerator opening APO and engine speed Ne.

At step S2002, a basic target air quantity tQacb is calculated or determined based on the required fuel injection quantity $Q_{FDRV}$ and the desired $\lambda$. As will be appreciated from the above, the value of the desired $\lambda$ is different depending on which of (i) DPF regeneration, (ii) NOx regeneration (rich spike mode), (iii) SOx regeneration (sulfur poisoning release mode), and (iv) catalyst warm-up promotion is selectively executed during the split retard combustion period. The desired $\lambda$ used for the split retard combustion mode is determined to be adequately relatively smaller rather than a desired $\lambda$ used for the normal lean combustion mode. Thus, basic target air quantity tQacb suitable for the split retard combustion period can be set to be adequately relatively smaller than that of the normal lean combustion mode.

At step S2003, a check is made to determine whether the engine is operated in the split retard combustion mode. When the answer to step S2003 is affirmative (during the split retard combustion mode), the routine proceeds from step S2003 to step S2004. Conversely when the answer to step S2003 is negative (out of the split retard combustion mode), the routine proceeds from step S2003 to step S2009.

Figure 27:
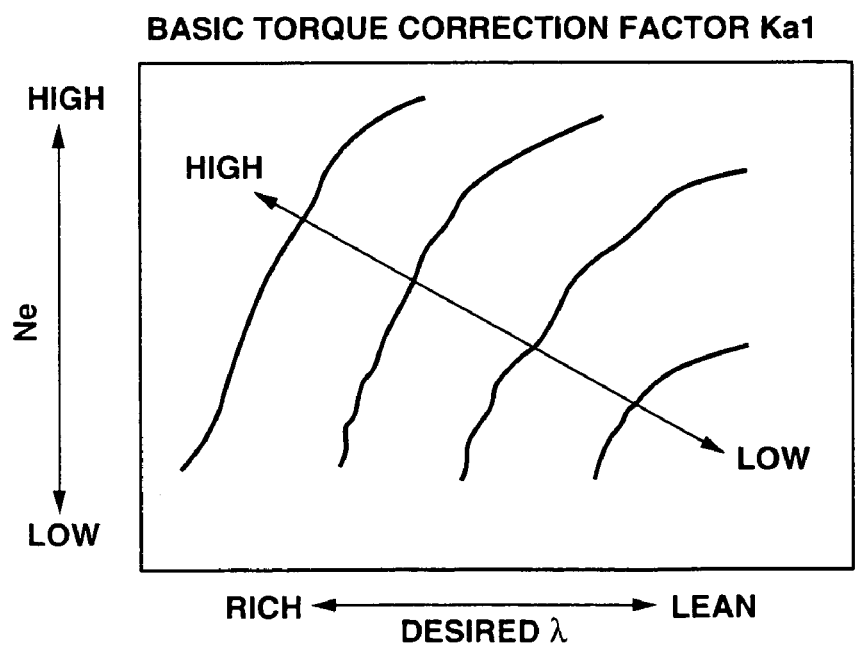
FIG. 27 is a characteristic map showing the relationship among a basic torque correction factor Ka1, desired λ, and engine speed Ne.

At step S2004, a basic torque correction factor Ka1 is calculated or determined based on engine speed Ne and the desired $\lambda$, from the preprogrammed Ne-$\lambda$-Ka1 characteristic map shown in FIG. 27. The smaller the desired $\lambda$ from the value "1" corresponding to the stoichiometric A/F ratio, the greater the engine torque drop. Basic torque correction factor Ka1 is increasingly compensated for, as the desired $\lambda$ varies from stoichiometric ($\lambda$=1) to rich ($\lambda$<1) (see FIG. 27). Additionally, for the same burn time (or the same combustion time), the engine torque tends to fall due to a crank-angle change, as engine speed Ne increases. Thus, basic torque correction factor Ka1 is also increasingly compensated for, as engine speed Ne increases (see FIG. 27).

Figure 28:
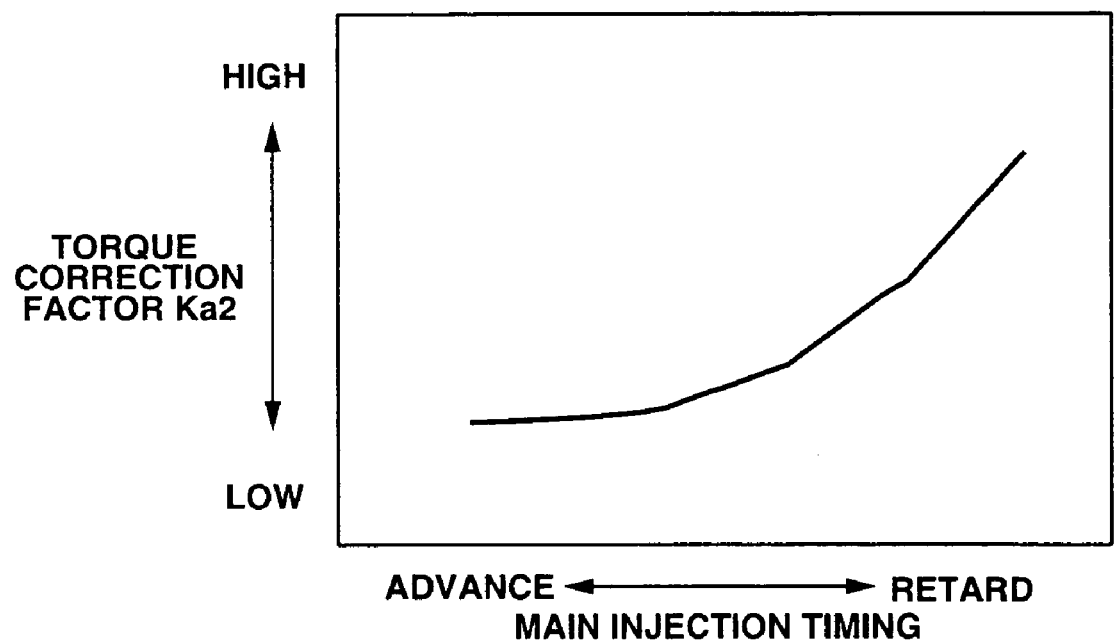
FIG. 28 is a preprogrammed torque correction factor Ka2 versus main injection timing characteristic map.

At step S2005, a torque correction factor Ka2 is calculated or determined based on the main injection timing of main injection "b" (see FIG. 15A). Concretely, torque correction factor Ka2 is retrieved based on the main injection timing from the preprogrammed characteristic map shown in FIG. 28. As seen from the map of FIG. 28, the greater the main injection timing becomes retarded, the greater torque correction factor Ka2 becomes. This is because the engine torque drop tends to increase, as the retardation amount of the main injection timing increases.

Figure 29:
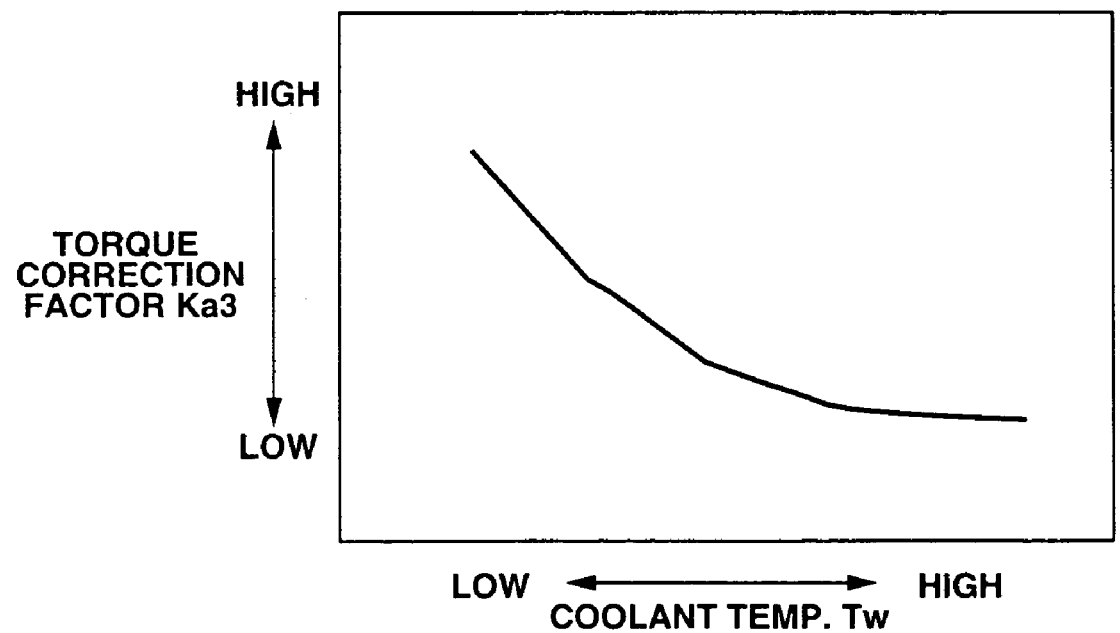
FIG. 29 is a preprogrammed torque correction factor Ka3 versus engine coolant temperature Tw characteristic map.

At step S2006, a water-temperature dependent torque correction factor Ka3 is calculated or determined based on the engine temperature (coolant temperature Tw). Concretely, torque correction factor Ka3 is retrieved based on the engine temperature Tw, from the preprogrammed Tw–Ka3 characteristic map shown in FIG. 29. As seen from the map of FIG. 29, the lower the engine temperature Tw, the greater torque correction factor Ka3 becomes. This is because the combustion efficiency tends to deteriorate and thus engine torque tends to drop, as the engine temperature Tw becomes lower. Such torque compensation based on water-temperature dependent torque correction factor Ka3 is very effective during the catalyst warm-up promotion mode.

At step S2007, a final torque correction factor Ka is calculated based on all of correction factors Ka1, Ka2, and Ka3, from the expression Ka=Ka1×Ka2×Ka3.

At step S2008, a target air quantity tQac is calculated or determined based on final correction factor Ka and basic target air quantity tQacb, from the expression tQac=tQacb× Ka.

Returning to step S2003, if the engine is operated out of the split retard combustion mode, step S2009 occurs.

At step S2009, basic target air quantity tQacb itself is set as target air quantity tQac, that is, tQac=tQacb.

After steps S2008 or S2009, step S2010 occurs.

At step S2010, the throttle opening of throttle valve 5 and the EGR valve opening of EGR control valve 12 are controlled to bring the actual air quantity closer to target air quantity tQac. In more detail, first, throttle valve 5 is controlled in a manner so as to realize target air quantity tQac. Thereafter, for the purpose of fine adjustment, EGR control valve 12 is feedback-controlled, so that actual air quantity Qac, detected by airflow meter 23, is brought closer to target air quantity tQac.

Referring now to FIG. 26, there is shown the fuel injection quantity control routine. The fuel injection quantity control routine of FIG. 26 is also executed as time-triggered interrupt routines to be triggered every predetermined time intervals.

At step S2101, information concerning actual air quantity Qac, detected by airflow meter 23, is read.

At step S2102, a target fuel injection quantity tQF is calculated or determined based on actual air quantity Qac and the desired $\lambda$.

At step S2103, each fuel injector 9 is controlled to bring the actual fuel injection quantity closer to target fuel injection quantity tQF.

As set forth above, during the split retard combustion period, target air quantity tQac, which is determined based on the required engine torque (equivalent to required fuel injection quantity $Q_{FDRV}$) and the desired $\lambda$, is increasingly compensated for by final torque correction factor Ka (=Ka1× Ka2×Ka3). Additionally, target fuel injection quantity tQF is calculated based on actual air quantity Qac and the desired $\lambda$, and the actual fuel injection quantity is controlled to realize the target fuel injection quantity. Thus, it is possible to effectively suppress the engine torque drop, while realizing the desired $\lambda$. Additionally, the torque compensation is achieved, taking into account the main injection timing (see the map of FIG. 28), and therefore it is possible to attain the optimum combustion control, while keeping the engine torque generated from engine 1 constant during the main combustion period. This enhances the combustion stability and the drivability.

Figure 30:
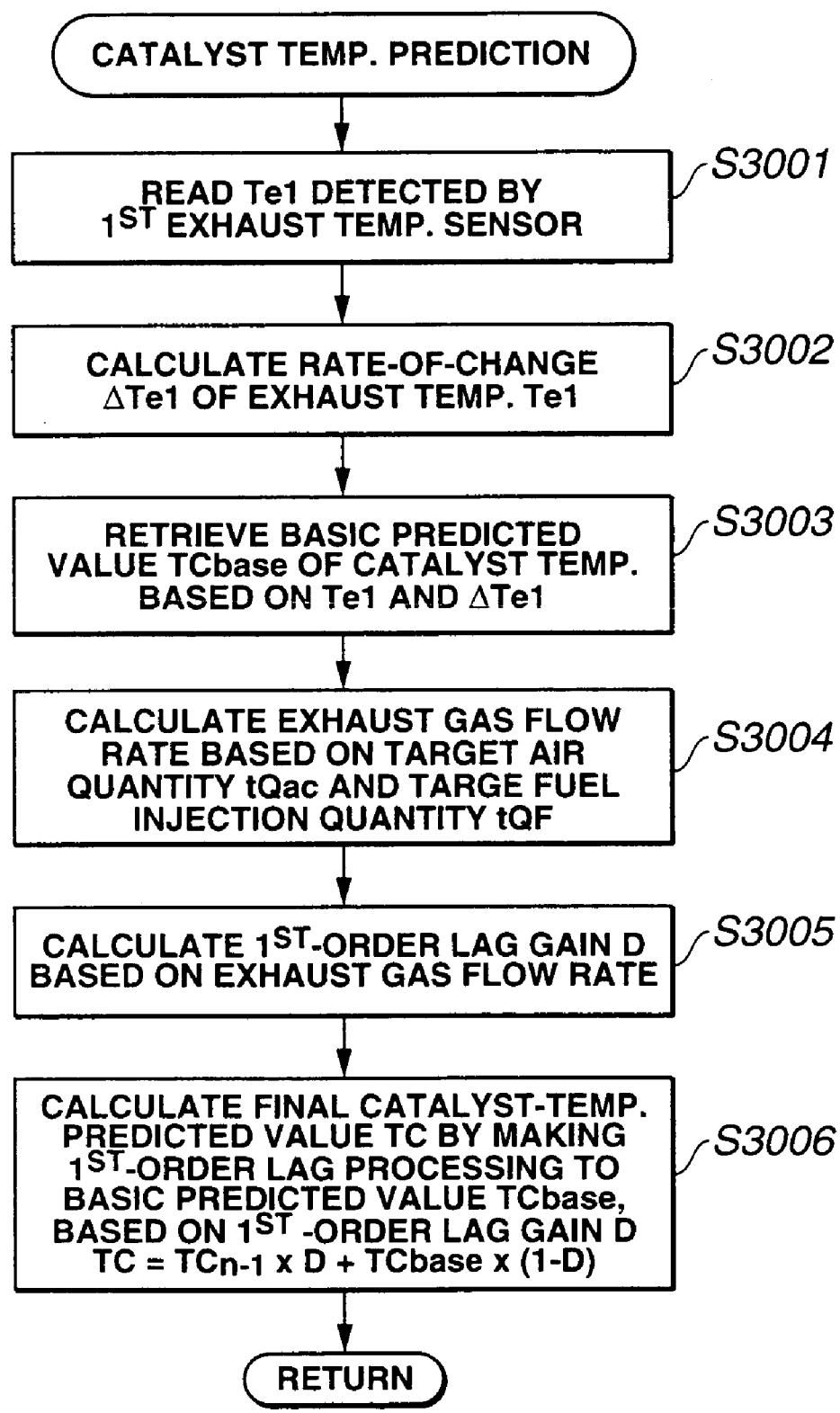
FIG. 30 is a flow chart used for catalyst temperature estimation.

Referring now to FIG. 30, there is shown the catalyst temperature estimation routine used for estimation or prediction of the catalyst temperature of NOx trap catalyst 13. The catalyst temperature estimation routine of FIG. 30 is also executed as time-triggered interrupt routines to be triggered every predetermined time intervals. As described previously, the catalyst temperature of NOx trap catalyst 13 is estimated based on an exhaust temperature Te1, which is detected by upstream exhaust temperature sensor (1$^{st}$ exhaust temperature sensor) $29_{T1}$ and sensed just downstream of NOx trap catalyst 13. For catalyst temperature prediction, a predetermined catalyst-temperature basic predicted value $TC_{base}$ versus exhaust temperature Te1 characteristic model (or a predetermined catalyst-temperature basic predicted value $TC_{base}$ versus exhaust temperature Te1 characteristic map) is preprogrammed, taking account of a heat capacity (a mass) and a heat conductivity of NOx trap catalyst 13, and a heat loss occurring between NOx trap catalyst 13 and 1$^{st}$ exhaust temperature sensor $29_{T1}$. The catalyst temperature, exactly, catalyst-temperature basic predicted value $TC_{base}$, is predicted or estimated or retrieved based on (i) exhaust temperature Te1, detected by 1$^{st}$ exhaust temperature sensor $29_{T1}$ and (ii) a time rate of change $\Delta$Te1 of exhaust temperature Te1, from the preprogrammed catalyst-temperature basic predicted value $TC_{base}$ versus exhaust temperature Te1 characteristic model.

At step S3001, exhaust temperature Te1, detected by 1$^{st}$ exhaust temperature sensor $29_{T1}$ is read.

At step S3002, a time rate of change $\Delta$Te1 of exhaust temperature Te1 is arithmetically calculated by way of differentiating exhaust temperature Te1.

At step S3003, basic predicted value $TC_{base}$ of the catalyst temperature of NOx trap catalyst 13 is estimated or retrieved based on (i) exhaust temperature Te1 and (ii) its time rate of change $\Delta$Te1, from the preprogrammed catalyst-temperature basic predicted value $TC_{base}$ versus exhaust temperature Te1 characteristic model.

At step S3004, an exhaust gas flow rate is calculated or retrieved based on target air quantity tQac and target fuel injection quantity tQF, from a preprogrammed map (not shown).

At step S3005, a first-order lag gain D (a rounding process gain) is calculated based on the exhaust gas flow rate. Concretely, the smaller the exhaust gas flow rate, the greater the first-order lag gain D.

At step S3006, a final catalyst-temperature predicted value TC is calculated by making the first-order lag processing to basic predicted value $TC_{base}$, based on first-order lag gain D. Concretely, by way of the weighted mean processing for the previous value $TC_{n-1}$ of final catalyst-temperature predicted value TC and the current value of basic predicted value $TC_{base}$, final catalyst-temperature predicted value TC is calculated, as follows.

$$TC = TC_{n-1} \times D + TC_{base} \times (1-D)$$

where $TC_{n-1}$ denotes the previous value of final catalyst-temperature predicted value TC, $TC_{base}$ denotes the current value of basic predicted value $TC_{base}$, first-order lag gain D is used as a weight of the weighted mean processing and set within a predetermined range defined by an inequality 0<D<1, the previous value $TC_{n-1}$ of final catalyst-temperature predicted value TC has a weight D, and the current value of basic predicted value $TC_{base}$ has a weight (1−D).

As discussed above, first-order lag gain D (the weight of previous value $TC_{n-1}$ of final catalyst-temperature predicted value TC) is set to increase, as the exhaust gas flow rate decreases. Therefore, the time rate of change of final catalyst-temperature predicted value TC tends to decrease, as the exhaust gas flow rate reduces. As appreciated, during operation of the engine at a small exhaust gas flow rate, as a matter of course, the amount of exhaust gas functioning to remove heat from NOx trap catalyst 13 is also small. The small exhaust gas flow rate means the difficulty of removing heat (heat of reaction of oxidation) from NOx trap catalyst 13. That is, there is a phenomenon that the Nox trap catalyst temperature itself does not fall but may be kept almost constant, even when the exhaust temperature Te1 detected downstream of NOx trap catalyst 13 tends to fall. The previously-discussed relational expression of final catalyst-temperature predicted value TC based on first-order lag gain D is advantageous with respect to accurate simulation or prediction of the previously-noted phenomenon.

Figure 31:
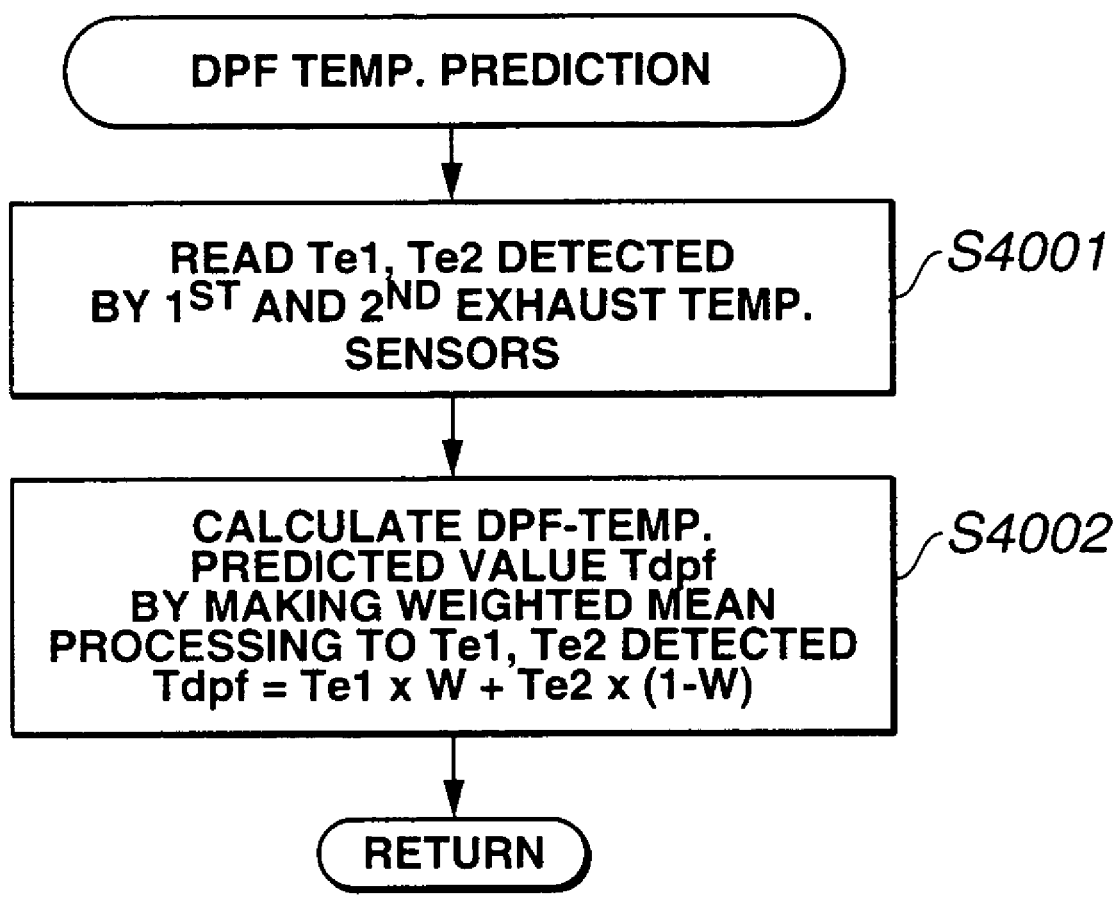
FIG. 31 is a flow chart showing used for DPF temperature estimation.

Referring now to FIG. 31, there is shown the DPF temperature estimation routine used for estimation or prediction of the DPF temperature of DPF 14. The DPF temperature estimation routine of FIG. 31 is also executed as time-triggered interrupt routines to be triggered every predetermined time intervals. As described previously, the DPF temperature is estimated based on exhaust temperatures Te1 and Te2, respectively detected by $1^{st}$ and $2^{nd}$ exhaust temperature sensors $29_{T1}$ and $29_{T2}$, located upstream and downstream of DPF 14. As appreciated, generally, the heat capacity of DPF 14 is greater than that of NOx trap catalyst 13. Owing to the greater heat capacity, the rate of temperature change of DPF 14 with respect to a change in exhaust temperature is relatively moderate. By way of the use of both of the detected values Te1 and Te2 of upstream and downstream exhaust temperature sensors $29_{T1}$ and $29_{T2}$, it is possible to simply easily estimate the DPF temperature (see the only two steps S4001 and S4002 of FIG. 31).

At step S4001, exhaust temperatures Te1 and Te2, detected by $1^{st}$ and $2^{nd}$ exhaust temperature sensors $29_{T1}$ and $29_{T2}$, are read.

At step S4002, a DPF temperature predicted value Tdpf is calculated based on exhaust temperatures Te1 and Te2 from the predetermined weighted-mean processing defined by the following expression.

$$Tdpf = Te1 \times W + Te2 \times (1-W)$$

where Te1 and Te2 respectively denote the exhaust temperature detected by $1^{st}$ exhaust temperature sensor $29_{T1}$ located upstream of DPF 14 and the exhaust temperature detected by $2^{nd}$ exhaust temperature sensor $29_{T2}$ located downstream of DPF 14, and W denotes a weighted-mean constant and is set within a predetermined range defined by an inequality $0<W<1$.

$1^{st}$ exhaust temperature Te1 has the weight W, while $2^{nd}$ exhaust temperature Te2 has the weight (1−W). In due consideration of the relatively greater heat capacity of DPF 14, the weight (W) of $1^{st}$ exhaust temperature Te1 is set to be higher than the weight (1−W) of $2^{nd}$ exhaust temperature Te2. For instance, in the system of the shown embodiment, the weight (W) of $1^{st}$ exhaust temperature Te1 is set to 0.7 (that is, W=0.7). In other words, the weight of (1−W) of $2^{nd}$ exhaust temperature Te2 is set to 0.3 (that is, (1−W)=0.3).

As will be appreciated from the above, according to the system of the embodiment, in presence of a request of an exhaust temperature rise, based on an operating condition of the exhaust purifying device, including at least NOx trap catalyst 13 and DPF 14, the previously-discussed split retard combustion mode is initiated. At the same time, the temperature of the exhaust purifying device (NOx trap catalyst 13 and DPF 14) is estimated or predicted. When the predicted temperature value of the exhaust purifying device exceeds its predetermined temperature threshold value, that is, upper limit T22 of the desired DPF temperature during DPF regeneration (see S103 in FIG. 3), or upper limit T42 of the desired catalyst temperature during SOx regeneration (see S203 in FIG. 4), the system of the embodiment executes the fail-safe processing that the injection timing (the start $t_{m1}$ of main fuel injection in FIG. 15A) of main fuel injection for main combustion is compensated for in the timing-advance direction (see the flow from step S103 through steps S111–S113 to step S114 in FIG. 3 and see the flow from step S203 through steps S211–S213 to step S214 in FIG. 4). Therefore, by virtue of such a fail-safe function (the phase-advance processing of the main fuel injection timing), it is possible to rapidly timely lower the exhaust temperature and consequently to protect the exhaust purifying device (NOx trap catalyst 13 and DPF 14), even when the undesirably excessive temperature rise of the exhaust purifying device occurs owing to certain causes.

When executing the fail-safe processing for the exhaust purifying device, the feedback compensation amount (phase-advanced amount $t_{advance}$) of the injection timing of main fuel injection for main combustion is calculated based on a temperature deviation ΔT (ΔT=Tdpf−T22 during DPF regeneration, or ΔT=TC−T42 during sulfur poisoning release) between the predicted temperature value and the predetermined temperature threshold value. The feedback gain G of exhaust temperature feedback control is calculated based on temperature deviation ΔT (ΔT=Tdpf−T22 during DPF regeneration, or ΔT=TC−T42 during sulfur poisoning release). Thus, feedback gain G is variably adjusted depending on temperature deviation ΔT. Thus, when temperature deviation ΔT is large, feedback gain G is increasingly compensated for, so as to rapidly lower the exhaust temperature. On the contrary, when temperature deviation ΔT is small, feedback gain G is decreasingly compensated for so as to prevent undesirable hunting (overshoot and/or undershoot), occurring due to a delay in exhaust temperature change based on fuel injection timing control. Compensating for feedback gain G based on temperature deviation ΔT effectively enhances the convergence of the exhaust purifying device temperature to the desired temperature value.

In estimating or predicting the exhaust purifying device temperature, in particular, NOx trap catalyst temperature (TC), based on the exhaust temperature Te1 detected by $1^{st}$ exhaust temperature sensor $29_{T1}$ located downstream of the exhaust purifying device (NOx trap catalyst 13), the system of the embodiment utilizes a predetermined exhaust purifying device predicted temperature versus exhaust temperature (Te1) characteristic model defining the correlation between the exhaust purifying device temperature and exhaust temperature Te1, based on a heat capacity and/or a heat conductivity of the exhaust purifying device. Thus, it is possible to more accurately estimate or predict the exhaust purifying device temperature (NOx trap catalyst temperature TC).

Additionally, the exhaust purifying device temperature, estimated by the predetermined characteristic model, is set or determined as a basic predicted value $TC_{base}$ of the exhaust purifying device temperature. A final exhaust-purifying-device-temperature predicted value TC is calculated by making the first-order lag processing to the basic predicted value $TC_{base}$, based on a first-order lag gain D. First-order lag gain D is variably adjusted, changed or compensated for depending on an exhaust gas flow rate. Thus, it is possible to avoid or minimize the occurrence of temperature prediction error, occurring owing to the difficulty of removing heat from the exhaust purifying device during engine operation at the small exhaust gas flow rate, thereby more greatly enhancing the accuracy of temperature prediction.

In estimating or predicting the exhaust purifying device temperature, in particular, DPF temperature (Tdpf), based on the exhaust temperatures Te1 and Te2 detected by $1^{st}$ and $2^{nd}$ exhaust temperature sensors $29_{T1}$ and $29_{T2}$ located upstream and downstream of the exhaust purifying device (DPF 14), the system of the embodiment utilizes the simple weighted-mean processing (Tdpf=Te1×W+Te2×(1−W)) for both of these two exhaust temperatures Te1 and Te2. Thus, it is possible to simply precisely estimate or predict the exhaust purifying device temperature (DPF temperature Tdpf).

Furthermore, when the exhaust purifying device is comprised of both of NOx trap catalyst 13 and DPF 14 located downstream of NOx trap catalyst 13, $1^{st}$ exhaust temperature sensor $29_{T1}$ is disposed downstream of NOx trap catalyst 13 and upstream of DPF 14, whereas $2^{nd}$ exhaust temperature sensor $29_{T2}$ is disposed downstream of DPF 14. The catalyst temperature TC of NOx trap catalyst 13 is estimated based on the exhaust temperature Te1, detected by $1^{st}$ exhaust temperature sensor $29_{T1}$ disposed downstream of NOx trap catalyst 13 and upstream of DPF 14. On the other hand, the DPF temperature Tdpf of DPF 14 is estimated based on the exhaust temperatures Te1 and Te2, detected by $1^{st}$ and $2^{nd}$ exhaust temperature sensors $29_{T1}$ and $29_{T2}$ disposed upstream and downstream of DPF 14. By the use of only two exhaust temperature sensors $29_{T1}$ and $29_{T2}$, it is possible to precisely estimate or predict the catalyst temperature TC and the DPF temperature Tdpf.

In the system of the shown embodiment, NOx trap catalyst 13 is laid out upstream of DPF 14. In other words, DPF 14 is laid out downstream of NOx trap catalyst 13. Conversely, DPF 14 may be laid out upstream of NOx trap catalyst 13. In such a case, the DPF temperature of DPF 14 is estimated based on the exhaust temperature Te1 detected by $1^{st}$ exhaust temperature sensor $29_{T1}$ disposed downstream of DPF 14 and upstream of NOx trap catalyst 13. On the other hand, the catalyst temperature of NOx trap catalyst 13 is estimated based on the exhaust temperatures Te1 and Te2, detected by $1^{st}$ and $2^{nd}$ exhaust temperature sensors $29_{T1}$ and $29_{T2}$ disposed upstream and downstream of NOx trap catalyst 13.

In the system of the shown embodiment, NOx trap catalyst 13 and DPF 14 are constructed separately from each other. In lieu thereof, DPF 14 may be constructed to be equipped integral with NOx trap catalyst 13. The temperature of the NOx-trap-catalyst-equipped DPF may be estimated based on an exhaust temperature detected by an exhaust temperature located downstream of the NOx-trap-catalyst-equipped DPF.

As set out above, according to the system of the shown embodiment, during the DPF regeneration execution cycle, the system estimates the DPF temperature, and executes the fail-safe processing by way of the phase-advance of the main injection timing, when the estimated DPF temperature rises excessively (Tdpf>T22). Likewise, during the sulfur poisoning release (SOx regeneration) execution cycle, the system estimates the catalyst temperature, and executes the fail-safe processing by way of the phase-advance of the main injection timing, when the estimated catalyst temperature rises excessively (TC>T42). If the heat capacity of NOx trap catalyst 13 is remarkably relatively smaller than that of DPF 14 and there is a problem of the deteriorated heat resisting property of NOx trap catalyst 13, it is preferable to compare the catalyst temperature to the predetermined catalyst-temperature threshold value even during the DPF regeneration execution cycle. If the estimated catalyst temperature rises excessively (TC>T42) during the DPF regeneration, the fail-safe processing must be initiated by advancing the main injection timing, thereby effectively preventing the NOx trap catalyst from being heat-damaged even during the DPF regeneration cyce.

The entire contents of Japanese Patent Application No. 2003-282360 (filed Jul. 30, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A combustion control system of an internal combustion engine employing an exhaust purifying device in an exhaust passage, comprising:
    sensors that detect operating conditions of the engine;
    a control unit being configured to be electronically connected to the sensors, for combustion control and fail-safe purposes; the control unit comprising a processor programmed to perform the following,
        (a) estimating an operating condition of the exhaust purifying device;
        (b) determining, based on the operating condition of the exhaust purifying device, whether a request for a rise in an exhaust temperature is present;
        (c) executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed;
        (d) predicting a temperature of the exhaust purifying device to determine a predicted temperature value; and
        (e) executing a fail-safe process according to which an injection timing of main fuel injection for the main combustion is compensated for in a timing-advance direction, when the predicted temperature value exceeds a predetermined temperature threshold value.

2. The combustion control system as claimed in claim 1, wherein the processor is further programmed for:
    (f) calculating a feedback compensation amount for compensation for the injection timing of main fuel injection in the timing-advance direction, based on a temperature deviation between the predicted temperature value and the predetermined temperature threshold value; and
    (g) variably adjusting a feedback gain for calculation of the feedback compensation amount, depending on the temperature deviation.

3. The combustion control system as claimed in claim 1, wherein the processor is further programmed for:
    (h) retrieving the temperature of the exhaust purifying device based on an exhaust temperature detected downstream of the exhaust purifying device from a predetermined characteristic model defining a correlation between the temperature of the exhaust purifying device and the exhaust temperature detected downstream of the exhaust purifying device, based on at least one of a heat capacity and a heat conductivity of the exhaust purifying device, to determine the predicted temperature value.

4. The combustion control system as claimed in claim 3, wherein the processor is further programmed for:
    (i) determining the temperature of the exhaust purifying device, retrieved based on the exhaust temperature detected downstream of the exhaust purifying device from the predetermined characteristic model, as a basic predicted value of the temperature of the exhaust purifying device;
    (j) calculating a final exhaust-purifying-device-temperature predicted value by making a first-order lag process to the basic predicted value, based on a first-order lag gain; and (k) variably adjusting the first-order lag gain based on an exhaust gas flow rate.

5. The combustion control system as claimed in claim 1, wherein the processor is further programmed for:
   (l) predicting the temperature of the exhaust purifying device based on exhaust temperatures detected upstream and downstream of the exhaust purifying device, by way of a weighted-mean process for both of the exhaust temperatures.

6. The combustion control system as claimed in claim 1, wherein:
   an injection quantity of preliminary fuel injection for the preliminary combustion is set to a fuel injection quantity needed in order for an in-cylinder temperature obtained during a main fuel injection period for the main combustion to exceed a self-ignitable temperature value.

7. The combustion control system as claimed in claim 1, wherein:
   a start of the main combustion is retarded from a start of the preliminary combustion by at least 20 degrees of crankangle, for initiating the main combustion after completion of the preliminary combustion.

8. The combustion control system as claimed in claim 1, wherein:
   an end of the main combustion is retarded by at least 50 degrees of crankangle from the top dead center on the compression stroke.

9. The combustion control system as claimed in claim 1, wherein:
   the exhaust temperature is controlled by changing the injection timing of main fuel injection during the main combustion.

10. The combustion control system as claimed in claim 1, wherein the processor is further programmed for:
    (m) executing a torque compensation process that keeps a torque generated by the engine constant during the main combustion for minimizing an engine torque difference before and after switching to the split retard combustion mode.

11. The combustion control system as claimed in claim 1, wherein:
    the exhaust purifying device comprises a particulate filter that accumulates particulate matter (PM) contained in exhaust gases, and
    a period that the request for the exhaust temperature rise based on the operating condition of the exhaust purifying device is present, is at least a particulate-filter regeneration period during which the PM accumulated in the particulate filter is burned and removed from the particulate filter by rising up the exhaust temperature.

12. The combustion control system as claimed in claim 1, wherein:
    the exhaust purifying device comprises a NOx trap catalyst that traps nitrogen oxides contained in exhaust gases when an exhaust air-fuel mixture ratio is lean, and
    a period that the request for the exhaust temperature rise based on the operating condition of the exhaust purifying device is present, is at least a sulfur poisoning release period during which sulfur oxides trapped by the NOx trap catalyst is desorbed from the NOx trap catalyst by rising up the exhaust temperature.

13. The combustion control system as claimed in claim 1, wherein:
    the exhaust purifying device comprises (i) a NOx trap catalyst that traps nitrogen oxides contained in exhaust gases when an exhaust air-fuel mixture ratio is lean, and (ii) a particulate filter that accumulates particulate matter contained in the exhaust gases and is disposed downstream of the NOx trap catalyst, and
    which further comprises a first exhaust temperature sensor disposed downstream of the NOx trap catalyst and upstream of the particulate filter, and a second exhaust temperature sensor disposed downstream of the particulate filter, and
    wherein a temperature of the NOx trap catalyst is predicted based on an exhaust temperature detected by the first exhaust temperature sensor disposed downstream of the NOx trap catalyst, and a temperature of the particulate filter is predicted based on both of the exhaust temperature detected by the first exhaust temperature sensor and an exhaust temperature detected by the second exhaust temperature sensor disposed downstream of the particulate filter.

14. The combustion control system as claimed in claim 13, wherein the processor is further programmed for:
    (n) calculating a temperature deviation between the NOx-trap-catalyst temperature predicted and the predetermined temperature threshold value;
    (o) variably adjusting a feedback gain of a feedback compensation amount for compensation for the injection timing of main fuel injection in the timing-advance direction, depending on the temperature deviation;
    (p) calculating the feedback compensation amount by multiplying the temperature deviation by the feedback gain; and
    (q) advancing the injection timing of main fuel injection by the feedback compensation amount, when the NOx-trap-catalyst temperature predicted based on the exhaust temperature detected by the first exhaust temperature sensor exceeds the predetermined temperature threshold value.

15. The combustion control system as claimed in claim 13, wherein the processor is further programmed for:
    (n) calculating a temperature deviation between the particulate-filter temperature predicted and the predetermined temperature threshold value;
    (o) variably adjusting a feedback gain of a feedback compensation amount for compensation for the injection timing of main fuel injection in the timing-advance direction, depending on the temperature deviation;
    (p) calculating the feedback compensation amount by multiplying the temperature deviation by the feedback gain; and
    (q) advancing the injection timing of main fuel injection by the feedback compensation amount, when the particulate-matter temperature predicted based on the exhaust temperatures detected by the first and second exhaust temperature sensors exceeds the predetermined temperature threshold value.

16. A combustion control system of an internal combustion engine employing an exhaust purifying device in an exhaust passage, comprising:
    sensor means for detecting operating conditions of the engine;
    a control unit being configured to be electronically connected to the sensor means, for combustion control and fail-safe purposes; the control unit comprising:
    (a) means for estimating an operating condition of the exhaust purifying device;

(b) means for determining, based on the operating condition of the exhaust purifying device, whether a request for a rise in an exhaust temperature is present;

(c) means for executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed;

(d) means for predicting a temperature of the exhaust purifying device to determine a predicted temperature value; and (e) means for executing a fail-safe process according to which an injection timing of main fuel injection for the main combustion is compensated for in a timing-advance direction, when the predicted temperature value exceeds a predetermined temperature threshold value.

17. A method of executing a fail-safe function for an exhaust purifying device disposed in an exhaust passage of an internal combustion engine capable of recovering an operating condition of the exhaust purifying device, the method comprising:

estimating the operating condition of the exhaust purifying device;

determining, based on the operating condition of the exhaust purifying device, whether a request for a rise in an exhaust temperature is present;

executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed;

predicting a temperature of the exhaust purifying device to determine a predicted temperature value; and executing a fail-safe process according to which an injection timing of main fuel injection for the main combustion is compensated for in a timing-advance direction, when the predicted temperature value exceeds a predetermined temperature threshold value.

18. A method of executing a fail-safe function for an exhaust purifying device including (i) a NOx trap catalyst that traps nitrogen oxides contained in exhaust gases when an exhaust air-fuel mixture ratio is lean, and (ii) a particulate filter that accumulates particulate matter contained in the exhaust gases and is disposed downstream of the NOx trap catalyst, both disposed in an exhaust passage of an internal combustion engine capable of recovering an operating condition of the exhaust purifying device, the method comprising:

disposing a first exhaust temperature sensor downstream of the NOx trap catalyst and upstream of the particulate filter;

disposing a second exhaust temperature sensor downstream of the particulate filter, predicting a temperature of the NOx trap catalyst based on an exhaust temperature detected by the first exhaust temperature sensor;

predicting a temperature of the particulate filter based on both of the exhaust temperature detected by the first exhaust temperature sensor and an exhaust temperature detected by the second exhaust temperature sensor;

estimating the operating condition of the exhaust purifying device;

determining, based on the operating condition of the exhaust purifying device, whether a request for a rise in an exhaust temperature is present;

executing, by way of fuel injection control in presence of the request for the exhaust temperature rise, a split retard combustion mode in which a main combustion needed to produce a main engine torque and at least one preliminary combustion occurring prior to the main combustion are both achieved and additionally the preliminary combustion takes place near top dead center on a compression stroke and additionally the main combustion initiates after the preliminary combustion has been completed; and executing a fail-safe process according to which an injection timing of main fuel injection for the main combustion is phase-advanced, when the at least one of the NOx-trap-catalyst temperature predicted and the particulate-filter temperature predicted exceeds a predetermined temperature threshold value.

19. The method as claimed in claim 18, further comprising:

calculating a temperature deviation between the NOx-trap-catalyst temperature predicted and the predetermined temperature threshold value;

variably adjusting a feedback gain of a feedback compensation amount for phase-advance of the injection timing of main fuel injection, depending on the temperature deviation;

calculating the feedback compensation amount by multiplying the temperature deviation by the feedback gain; and phase-advancing the injection timing of main fuel injection by the feedback compensation amount, when the NOx-trap-catalyst temperature predicted based on the exhaust temperature detected by the first exhaust temperature sensor exceeds the predetermined temperature threshold value.

20. The method as claimed in claim 18, further comprising:

calculating a temperature deviation between the particulate-filter temperature predicted and the predetermined temperature threshold value;

variably adjusting a feedback gain of a feedback compensation amount for phase-advance of the injection timing of main fuel injection, depending on the temperature deviation;

calculating the feedback compensation amount by multiplying the temperature deviation by the feedback gain; and phase-advancing the injection timing of main fuel injection by the feedback compensation amount, when the particulate-matter temperature predicted based on the exhaust temperatures detected by the first and second exhaust temperature sensors exceeds the predetermined temperature threshold value.

* * * * *